(12) United States Patent
Nelson

(10) Patent No.: US 8,201,950 B2
(45) Date of Patent: Jun. 19, 2012

(54) CAMERA-BASED REGISTRATION FOR PROJECTOR DISPLAY SYSTEMS

(75) Inventor: Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 408 days.

(21) Appl. No.: 12/549,011

(22) Filed: Aug. 27, 2009

(65) Prior Publication Data

US 2011/0051094 A1 Mar. 3, 2011

(51) Int. Cl.
- G03B 21/26 (2006.01)
- G03B 37/04 (2006.01)
- G09G 5/00 (2006.01)
- H04N 3/22 (2006.01)
- G06K 9/48 (2006.01)

(52) U.S. Cl. ............. 353/94; 353/31; 345/1.3; 348/745; 382/199; 352/70

(58) Field of Classification Search ................... 353/94, 353/31; 345/1.3; 348/745; 382/199; 352/70
See application file for complete search history.

(56) References Cited

U.S. PATENT DOCUMENTS

| | | | |
|---|---|---|---|
| 6,733,138 B2 | 5/2004 | Raskar | |
| 6,939,011 B2 | 9/2005 | Kobayashi | |
| 7,001,023 B2 | 2/2006 | Lee et al. | |
| 7,146,036 B2 * | 12/2006 | An Chang et al. | ............ 382/154 |
| 2005/0001986 A1 | 1/2005 | Matsuda | |
| 2007/0091277 A1 | 4/2007 | Damera-Venkata et al. | |
| 2008/0174516 A1 * | 7/2008 | Xiao et al. | ..................... 345/1.3 |

OTHER PUBLICATIONS

Scharstein, D., et al., "High-Accuracy Stereo Depth Maps Using Structured Light", IEEE Computer Society Conference on Computer Vision and Pattern Recognition (CVPR 2003), vol. 1, pp. 195-202, Jun. 2003.
Lee, J., et al., "Automatic Projector Calibration with Embedded Light Sensors", Proceedings of the 17th annual ACM Symposium on User Interface Software and Technology, Santa Fe NM, pp. 123-126, 2004.
Boynton, P.A., et al., "Stray Light Elimination in Making Projection Display Measurements", Flat Panel Display Technology and Display Metrology Conference, San Jose, CA, 1999.
Raskar, R., et al., "Seamless Projection Overlaps using Image Warping and Intensity Blending", Fourth International Conference on Virtual Systems and Multimedia, Gifu, Japan, Nov. 1998.
Wu, H.B., et al., "3D Measurement Technology by Structured Light Using Stripe-Edge-Based Gray Code", Journal of Physics: Conference Series 48, International Symposium on Instrumentation Science and Technology, pp. 537-541, 2006.

* cited by examiner

Primary Examiner — Georgia Y Epps
Assistant Examiner — Magda Cruz

(57) ABSTRACT

A method having corresponding apparatus and computer-readable media comprises: receiving a first image, wherein the first image includes a plurality of substantially parallel first stripes, wherein the first image conforms to a virtual display space, wherein the virtual display space comprises a first plurality of first pixel locations; projecting the first image from a projector onto a surface, wherein the projector is described by a projector space comprising a second plurality of second pixel locations; capturing a second image of the first image projected onto the surface, wherein the second image conforms to the virtual display space; detecting edges of the first stripes based on the second image; generating second stripes based upon the edges of the first stripes; and determining a correspondence between each second pixel location and one or more of the first pixel locations based upon the second stripes.

19 Claims, 21 Drawing Sheets

```
private BufferedImage fillColumns(BufferedImage verticalLeft,BufferedImage
verticalRight) { logger.debug("fillColumns In");

final int width = verticalLeft.getWidth();
    final int height = verticalLeft.getHeight();

BufferedImage bufferedImage = new BufferedImage(width, height,
    BufferedImage.TYPE_BYTE_GRAY);

WritableRaster outRaster = bufferedImage.getRaster();
    Raster verticalLeftRaster = verticalLeft.getRaster();
    Raster verticalRightRaster = verticalRight.getRaster();
    Raster maskRaster = maskBufferedImage.getRaster();

int[] pixelVerticalLeft = new int[1];
    int[] pixelVerticalRight = new int[1];
    int[] pixelMask = new int[1];
    int[] pixel255 = new int[1];
    pixel255[0] = 255;

boolean bColumnStart = false;

for (int j = 0; j < height; j++) { bColumnStart = false;
        // First left to right
        for (int i = 0; i < width; i++) {
            verticalLeftRaster.getPixel(i, j, pixelVerticalLeft);
            if (pixelVerticalLeft[0] == 255) {
                verticalRightRaster.getPixel(i, j, pixelVerticalRight);
                if (pixelVerticalRight[0] != 255) {
                    bColumnStart = true;
                }
            }
            else if (bColumnStart == true) {
                verticalRightRaster.getPixel(i, j, pixelVerticalRight);
                if (pixelVerticalRight[0] == 255) {
                    outRaster.setPixel(i, j, pixel255);
                    bColumnStart = false;
                }
                else {
                    maskRaster.getPixel(i, j, pixelMask);
                    if (pixelMask[0] != 0) {
                        outRaster.setPixel(i, j, pixel255);
                    }
                }
            }
        }
    }
```

*FIG. 18A*

```
        bColumnStart = false;
        // Then right to left
        for (int i = width - 1; i >= 0; i--) {
            verticalRightRaster.getPixel(i, j, pixelVerticalRight);
            if (pixelVerticalRight[0] == 255) {
                verticalLeftRaster.getPixel(i, j, pixelVerticalLeft);
                if (pixelVerticalLeft[0] != 255) {
                    bColumnStart = true;
                    maskRaster.getPixel(i, j, pixelMask);
                    if (pixelMask[0] != 0) {
                        outRaster.setPixel(i, j, pixel255);
                    }
                }
            }
            else if (bColumnStart == true) {
                verticalLeftRaster.getPixel(i, j, pixelVerticalLeft);
                if (pixelVerticalLeft[0] == 255) {
                    //outRaster.setPixel(i, j, pixel255);
                    bColumnStart = false;
                }
                else {
                    maskRaster.getPixel(i, j, pixelMask);
                    if (pixelMask[0] != 0) {
                        outRaster.setPixel(i, j, pixel255);
                    }
                }
            }
        }
    }
    logger.debug("fillColumns Out");
    return bufferedImage;
}
```

FIG. 18B

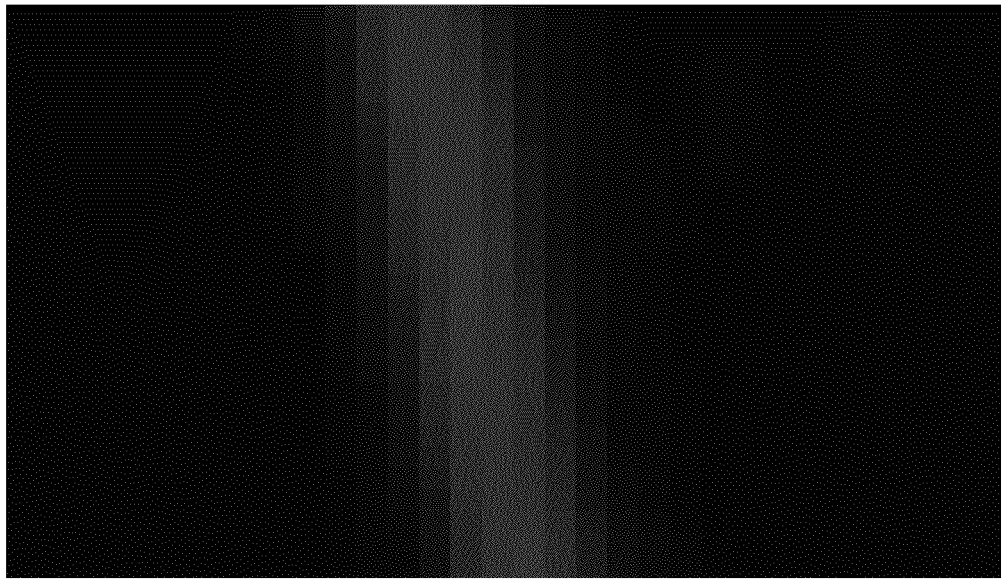

FIG. 27

```
  public final int startOffset;     // Starting offset of line width sample, not-inclusive, offset value of zero before
non-zero line values
  public final int endOffset;       // Ending offset of line width sample, not-inclusive, offset value of zero after non-
zero line values
  public final int middleOffset;    // Middle offset of line
  public final int maxOffset;       // Offset of maximum value within line width sample
  public final int maxOffsetValue;  // Actual maximum value located at maxOffset
```

FIG. 28

```
// Ring buffer containing recent max offset amounts
  private RingBuffer<Integer> ringBufferMaxOffset = new
RingBuffer<Integer>(AVERAGE_SAMPLES_MAX_OFFSET);
  // Ring buffer containing recent max offset values
  private RingBuffer<Integer> ringBufferMaxOffsetValues = new
RingBuffer<Integer>(AVERAGE_SAMPLES_MAX_OFFSET_VALUES);
  private final int initialMaxOffset; // Max offset found during initial line detection, usually middle of line. Set to -1
for lines found after initial search
  private int offset;             // Current offset into pixel row/column buffer to start search for line width sample
  private int maxOffset;          // Offset of maximum value found in line width sample
  private int maxOffsetValue;     // Maximum value found when searching for line width sample
  private boolean tracking = true;  // Currently following the line, valid data
  private int missingPixelCount = 0;    // Number of missing pixels found. Reset to zero when valid line sample
found
  private final boolean addedLine;  // True if line found after initial detection. Does not intersect with center line of
image
  private int startOffset;        // Offset of start of line, non-inclusive
  private int endOffset;          // Offset of end of line, non-inclusive
```

FIG. 29

```
    logger.debug("enhanceColumns middle row up to height=" + height);
    final int lastRow = height - EDGE_BORDER;
    for (int y=middleRow; y < height; y++) {
       rowPixels = raster.getPixels(0, y, width, 1, rowPixels);
       processRow(y,rowPixels,rasterOut);
       if (y < lastRow) {
          checkMore(rowPixels,y);
       }
    }
```

FIG. 30

CAMERA-BASED REGISTRATION FOR PROJECTOR DISPLAY SYSTEMS

FIELD

The present disclosure relates generally to projector-based display systems. More particularly, the present disclosure relates to projector registration for projector-based display systems.

BACKGROUND

With an ever growing desire to see more information with better quality, large-screen displays have become quite popular. Increasing screen resolutions and sizes are continually emerging and made available in televisions, computer monitors, and other video devices. Until recent times, large screen displays were typically too costly, physically unwieldy, or simply unavailable. Video projectors provided one solution, enabling a wide range of communication and entertainment functions by offering a significantly greater display area relatively inexpensively. These devices have found application in conference rooms for presentations, home theaters, classroom training, and advertising billboard displays.

Similar to other video device technologies, video projectors continue to advance their displayable pixel resolution and light output. Today commodity projectors are brighter, offer better quality, and are often less expensive than those of prior years. Highly portable projectors (in both weight and size) are also becoming readily available. No longer do commodity projectors remain constrained to dimly lit rooms with well prepared display surfaces. A video projector's small physical size relative to its large projection output therefore remains appealing.

Even with these improvements, however, it is still difficult or impossible for a single commodity projector to achieve very high resolutions, project over vast areas, or create bright projections on very bright surface areas (for example, near day lit windows). Applications demanding such display qualities, however, are becoming more desirable. The benefits of increased resolution, brightness, and larger display surface area have proven useful for reaching bigger audiences and providing full-scale life-sized immersive environments. Unfortunately, construction of such large displays is complex and costly.

One common technique, such as grouping multiple projectors together and tiling their projection output to produce large screen displays of any desired size, presents challenging problems with registration (that is, alignment of projector pixels). Color and luminosity variance across separate devices and even within a given device is difficult to correct. Minor shape or geometric inconsistencies of the display surface can also hinder adequate results. Projector lumens, or light output, may not be adequate for brighter locations. Synchronizing content delivery to the individual components forming in the larger display are additional hurdles to solve. Some of these problems apply to single-projector displays as well.

Solutions to some of these system problems take many forms. Many require precise pixel and color alignment using manual methods that require physical adjustment of the projector placement. If the output pixels from one projector are not close enough to those from another projector, a visible gap may occur between the projections on the composite display. Likewise, overlapping pixels across projectors produce bright seams that are also objectionable. High-end projectors with specialized lens optics or edge blending/blurring filters may be available to reduce some of these troubles, but are far from optimal.

Specialized projectors and mounting hardware, measurement tools, and tedious calibration methods are additional requirements that add to the resource costs and complexities of physical projector alignment which can become too demanding for the average user. The advanced skills and time requirements are more than most will invest. In many configurations, physical alignment may even be impossible using projectors with limited optic pathways, or with even slightly irregular display surfaces. When changes are necessary to replace failed lamps, the calibration methods often need repeating.

What is needed is a system that provides an easy calibration and playback mechanism offering the typical user an automated method to create a composite display from one or more commodity projectors, even in the presence of high ambient light levels. This method should offer a relatively quick one-time calibration function to be performed once after casual projector placement or changes.

SUMMARY

In general, in one aspect, an embodiment features a method comprising: receiving a first image, wherein the first image includes a plurality of substantially parallel first stripes, wherein the first image conforms to a virtual display space, wherein the virtual display space comprises a first plurality of first pixel locations; projecting the first image from a projector onto a surface, wherein the projector is described by a projector space comprising a second plurality of second pixel locations; capturing a second image of the first image projected onto the surface, wherein the second image conforms to the virtual display space; detecting edges of the first stripes based on the second image; generating second stripes based upon the edges of the first stripes; and determining a correspondence between each second pixel location and one or more of the first pixel locations based upon the second stripes.

Embodiments of the method can include one or more of the following features. Some embodiments comprise projecting a third image from the projector onto the surface based on the correspondence, wherein the third image conforms to the virtual display space. Some embodiments comprise generating the second stripes based upon one or more Gray codes. Some embodiments comprise capturing a fourth image of ambient light falling upon the surface, wherein the fourth image conforms to the virtual display space; receiving a raster image, wherein the raster image includes a plurality of substantially parallel lines, and wherein the raster image conforms to the virtual display space; projecting the raster image from the projector onto the surface; capturing a fifth image of the raster image projected onto the surface, wherein the fifth image conforms to the virtual display space; determining the correspondence based upon the second stripes, the fourth image, and the fifth image. Some embodiments comprise generating a first grayscale image based on a color channel of the fourth image; generating a second grayscale image based on the color channel of the fifth image; generating a difference image, comprising subtracting the first grayscale image from the second grayscale image; and determining the correspondence based upon the second stripes and the difference image. Some embodiments comprise generating an enhanced difference image, comprising enhancing the lines in the difference image; and determining the correspondence based upon the second stripes and the enhanced difference image. In some embodiments, the fourth and fifth images are RGB images; and the color channel is green.

In general, in one aspect, an embodiment features an apparatus comprising: an input module to receive a first image, wherein the first image includes a plurality of substantially parallel first stripes, wherein the first image conforms to a virtual display space, wherein the virtual display space comprises a first plurality of first pixel locations; a projector to project the first image onto a surface, wherein the projector is described by a projector space comprising a second plurality of second pixel locations; a camera to capture a second image of the first image projected onto the surface, wherein the second image conforms to the virtual display space; a edge module to detect edges of the first stripes based on the second image; a stripe module to generate second stripes based upon the edges of the first stripes; and a correspondence module to determine a correspondence between each second pixel location and one or more of the first pixel locations based upon the second stripes.

Embodiments of the apparatus can include one or more of the following features. In some embodiments, the projector projects a third image from the projector onto the surface based on the correspondence, wherein the third image conforms to the virtual display space. In some embodiments, the stripe module generates the second stripes based upon one or more Gray codes. In some embodiments, the camera captures a fourth image of ambient light falling upon the surface, wherein the fourth image conforms to the virtual display space; wherein the input module receives a raster image, wherein the raster image includes a plurality of substantially parallel lines, and wherein the raster image conforms to the virtual display space; wherein the projector projects the raster image from the projector onto the surface; wherein the camera captures a fifth image of the raster image projected onto the surface, wherein the fifth image conforms to the virtual display space; and wherein the correspondence module determines the correspondence based upon the second stripes, the fourth image, and the fifth image. In some embodiments, the apparatus further comprises a grayscale module to generate a first grayscale image based on a color channel of the fourth image, and to generate a second grayscale image based on the color channel of the fifth image, and a difference module to generate a difference image, comprising subtracting the first grayscale image from the second grayscale image; and wherein the correspondence module determines the correspondence based upon the second stripes and the difference image. Some embodiments comprise an enhancement module to generate an enhanced difference image based on the difference image; wherein the correspondence module determines the correspondence based upon the second stripes and the enhanced difference image. In some embodiments, the fourth and fifth images are RGB images; and the color channel is green.

In general, in one aspect, an embodiment features tangible computer-readable media embodying instructions executable by a computer to perform a method comprising: receiving a second image captured from a first image projected from a projector onto a surface, wherein the first image includes a plurality of substantially parallel first stripes, wherein the first image conforms to a virtual display space, wherein the virtual display space comprises a first plurality of first pixel locations, wherein the second image conforms to the virtual display space, and wherein the projector is described by a projector space comprising a second plurality of second pixel locations; detecting edges of the first stripes based on the second image; generating second stripes based upon the edges of the first stripes; and determining a correspondence between each second pixel location and one or more of the first pixel locations based upon the second stripes.

Embodiments of the tangible computer-readable media can include one or more of the following features. In some embodiments, the projector projects a third image onto the surface based on the correspondence, wherein the third image conforms to the virtual display space. In some embodiments, the method further comprises: generating the second stripes based upon one or more Gray codes. In some embodiments, the method further comprises: receiving a fourth image of ambient light falling upon the surface, wherein the fourth image conforms to the virtual display space; receiving a fifth image of a raster image projected from the projector onto the surface, wherein the raster image includes a plurality of substantially parallel lines, wherein the raster image conforms to the virtual display space, and wherein the fifth image conforms to the virtual display space; and determining the correspondence based upon the second stripes, the fourth image, and the fifth image. In some embodiments, the method further comprises: generating a first grayscale image based on a color channel of the fourth image; generating a second grayscale image based on the color channel of the fifth image; generating a difference image, comprising subtracting the first grayscale image from the second grayscale image; and determining the correspondence based upon the second stripes and the difference image. In some embodiments, the method further comprises: generating an enhanced difference image, comprising enhancing the lines in the difference image; and determining the correspondence based upon the second stripes and the enhanced difference image. In some embodiments, the fourth and fifth images are RGB images; and the color channel is green.

The details of one or more implementations are set forth in the accompanying drawings and the description below. Other features will be apparent from the description and drawings, and from the claims.

DESCRIPTION OF DRAWINGS

FIGS. 18A-B show example code for reproducing the stripes based on the enhanced lines.

FIG. 27 is a close-up view of a line in FIG. 26.

FIG. 28 shows data members of a LineOffset object.

FIG. 29 shows data members of a LineTrackingData object.

FIG. 30 shows example code for implementing a processing loop.

Figure 1:
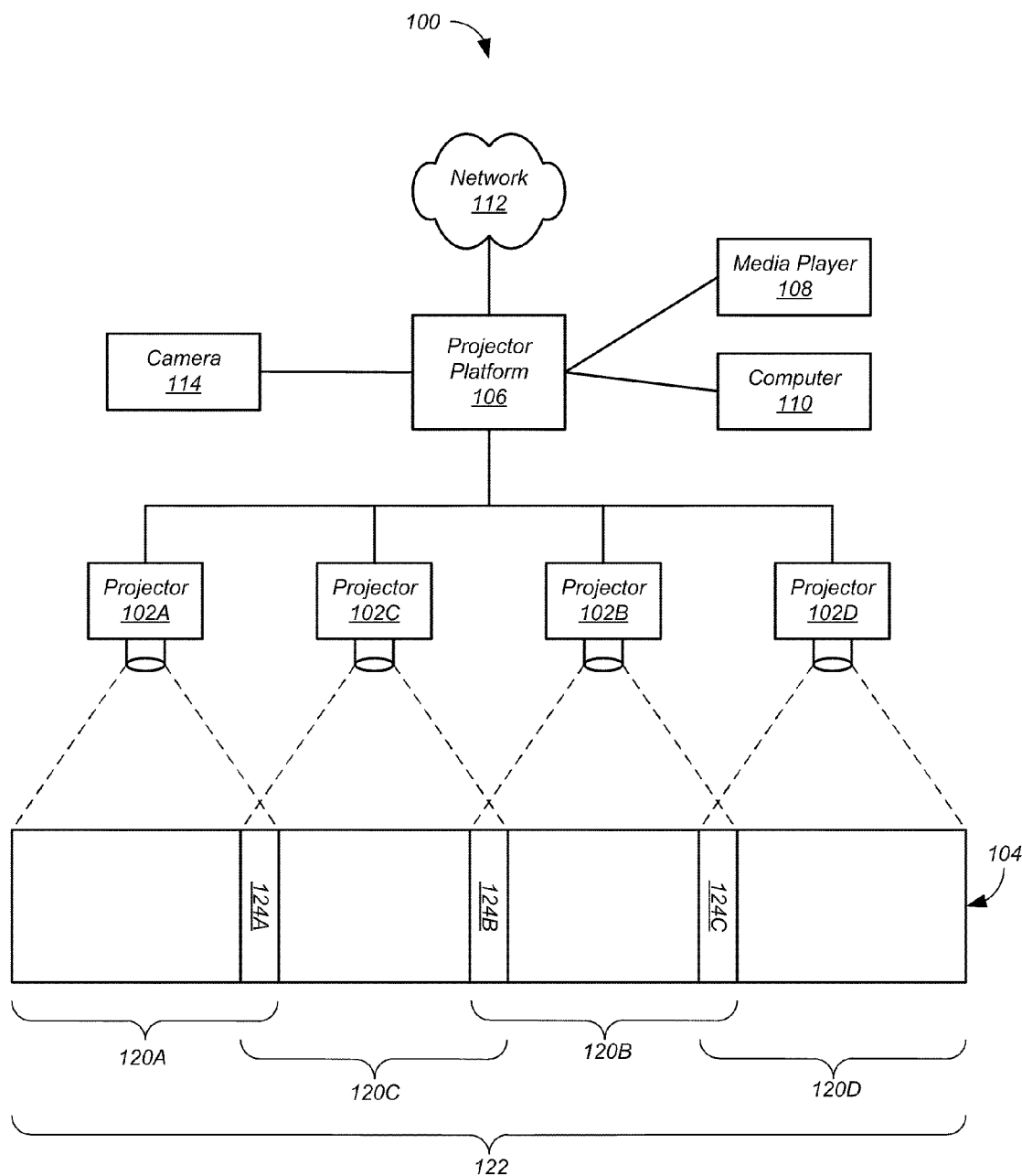
FIG. 1 shows a multi-projector display system according to some embodiments.

The leading digit(s) of each reference numeral used in this specification indicates the number of the drawing in which the reference numeral first appears.

DETAILED DESCRIPTION

The present invention relates to camera-based registration of projector display systems. During registration, one or more projectors project calibration images upon a display surface. A camera captures one or more images of each projected calibration image. A projector platform creates a mapping, for each projector, between pixel locations of the camera and pixel locations of the projector. After registration, the mappings are used to warp images prior to projection. The registration and warping techniques can be used for multi-projector systems as well as for single-projector systems.

The registration process can use one or both of two techniques to create the mappings. According to the first technique, a coarse mapping is created for each projector using striped calibration images, which can be generated using Gray codes. This technique can establish a mapping to within approximately sixteen pixels. According to the second technique, raster calibration images are used. When both techniques are used, a precise mapping can be created between pixel locations of the camera and pixel locations of the projector. The mappings can be used for correcting projection distortions such as keystoning, aligning multiple projections, and the like.

FIG. 1 shows a multi-projector display system 100 according to some embodiments. System 100 includes four projectors 102A-102D aimed at a display surface 104. Of course, other numbers of projectors 102 can be employed. For example, a single projector 102 can be used. Data is provided to projectors 102 by a projector platform 106, which can obtain source input from a media player 108, a computer 110, a source connected by a network 112 such as the Internet, and the like. For calibration, system 100 includes a digital still camera 114.

In one embodiment, system 100 includes four projectors 102 and projector platform 106 is implemented as a personal computer (PC) configured with a central processing unit (CPU) and graphic processing units (GPU) providing four video outputs each connected to one of projectors 102. An optional capture card provides video input from sources such as computer 110, media player 108, and the like. Digital still camera 114 is attached to the PC for the calibration process. In other embodiments, a video camera may be used for the calibration process. After calibration, digital still camera 114 may be removed or used as a media input device by projector platform 106.

Projectors 102A-102D produce respective component projections 120A-120D upon display surface 104. Together component projections 120A-120D form a single composite projection 122. Note that component projections 120 overlap in regions 124A-124C.

Figure 2:
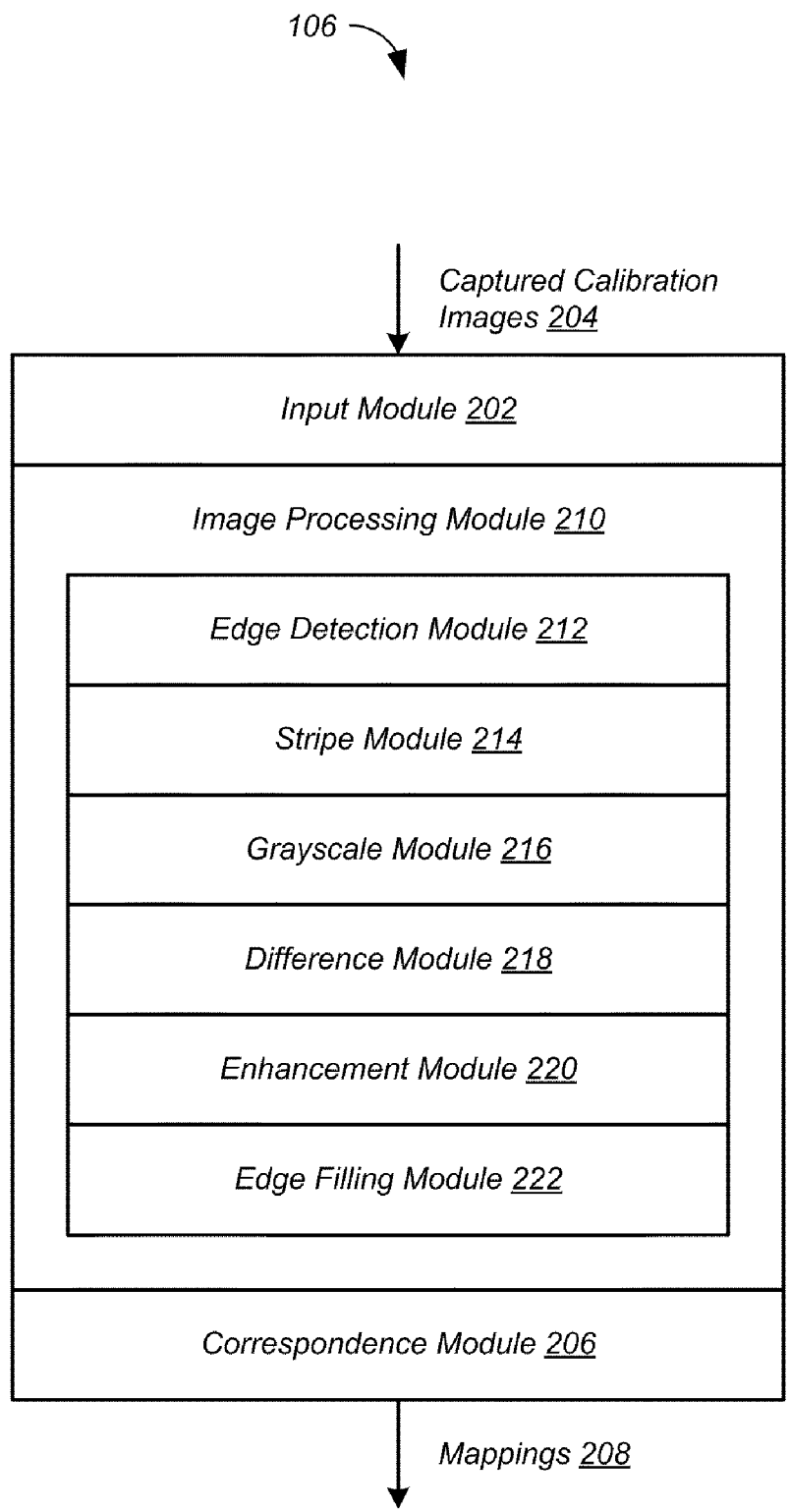
FIG. 2 shows elements of the projector platform of FIG. 1 for registering projectors according to some embodiments.

FIG. 2 shows elements of projector platform 106 of FIG. 1 for registering projectors 102 according to some embodiments. Although in the described embodiments, apparatus elements are presented in one arrangement, other embodiments may feature other arrangements, as will be apparent to one skilled in the relevant arts based on the disclosure and teachings provided herein. For example, the apparatus elements can be implemented in hardware, software, or combinations thereof.

Referring to FIG. 2, projector platform 106 includes an input module 202 adapted to receive captured calibration images 204 from camera 114 and a correspondence module 206 adapted to generate mappings 208 between pixel locations of camera 114 and pixel locations of projectors 102. Projector platform 106 also includes an image processing module 210 that includes an edge detection module 212, a stripe module 214, a grayscale module 216, a difference module 218, an enhancement module 220, and an edge filling module 222.

Figure 3A:
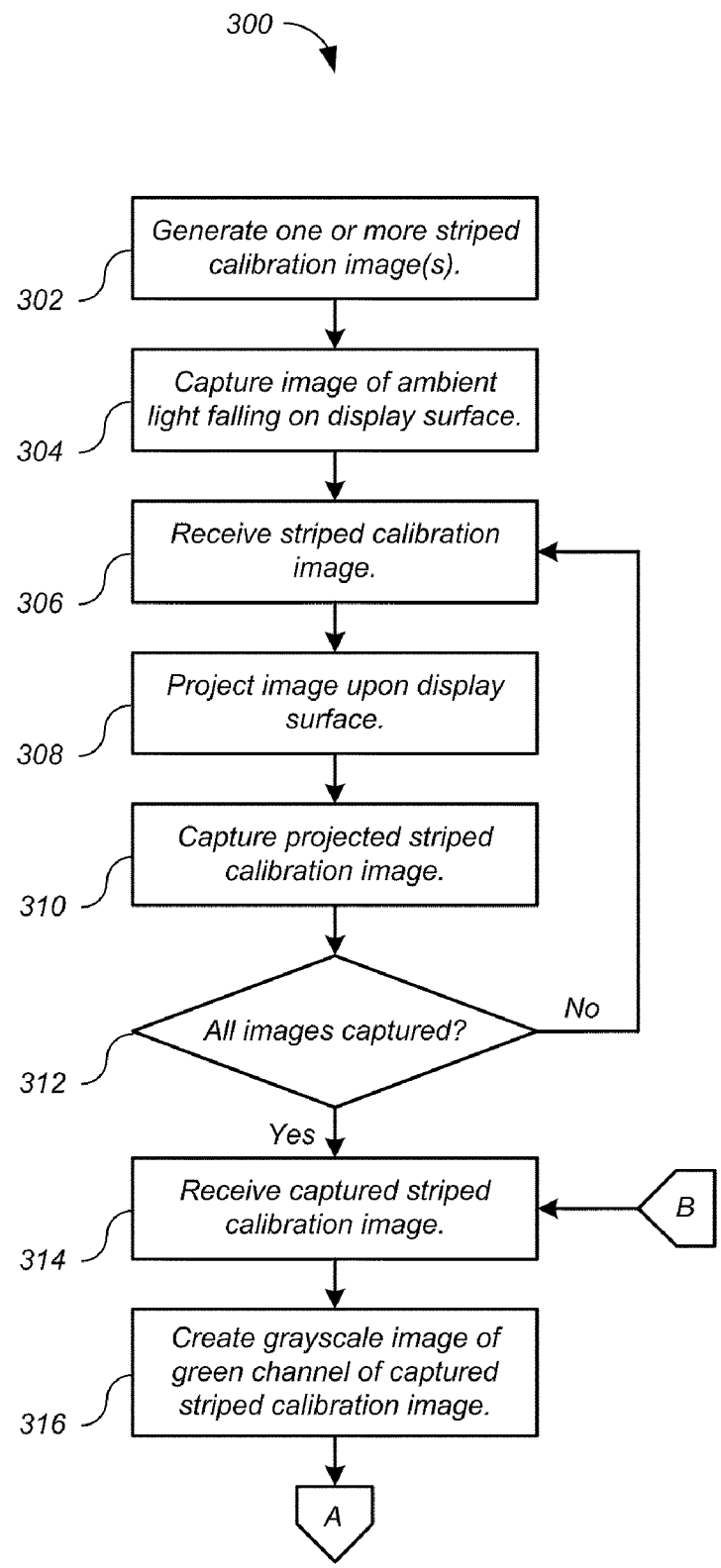
FIGS. 3A-3B show a process for the projector platform of FIG. 2 for registering a projector using striped calibration images according to some embodiments.
Figure 3B:
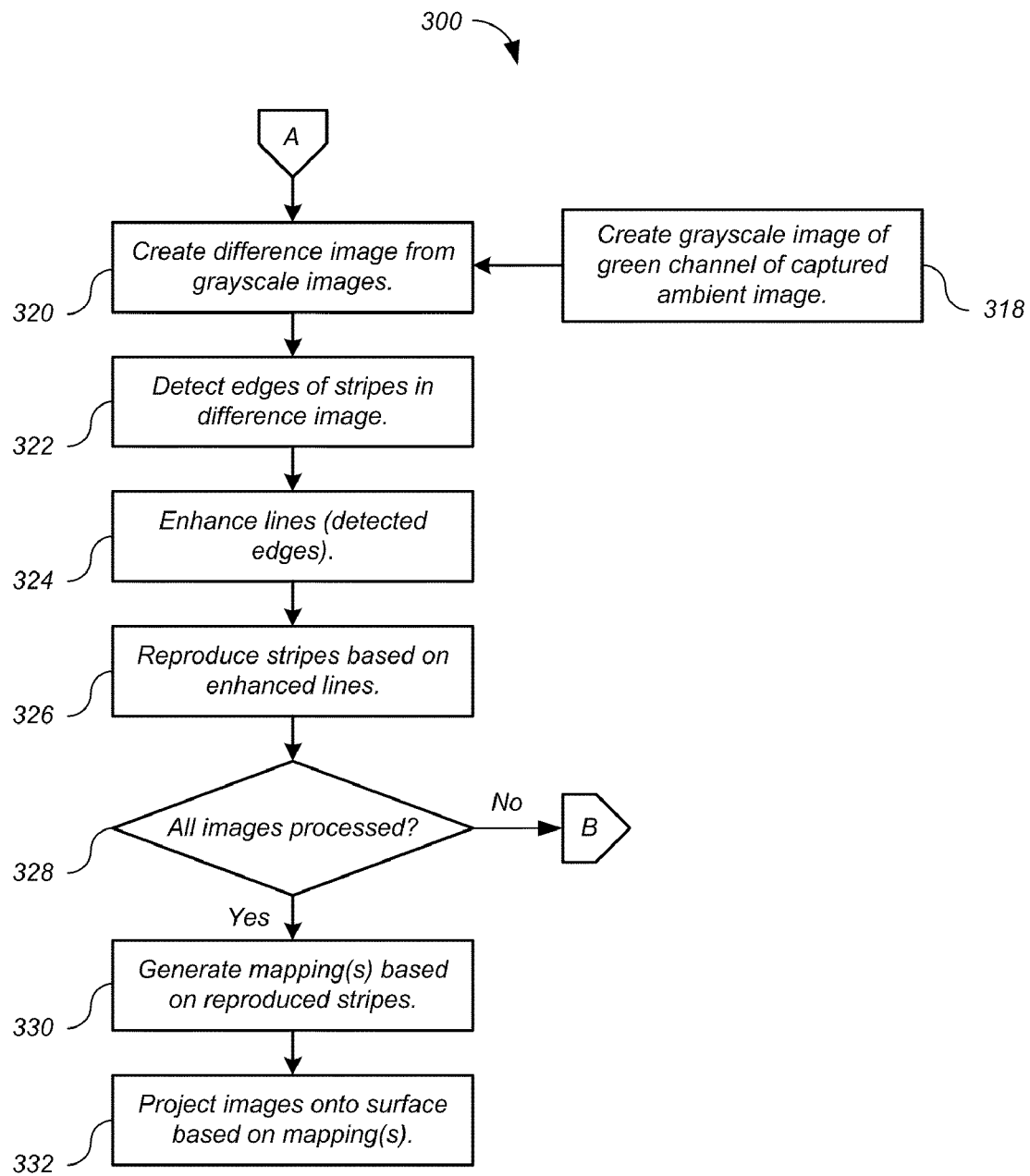
Figure 4:
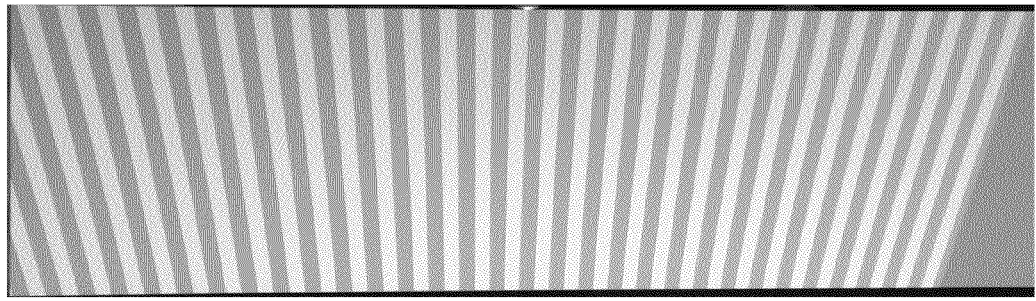
FIGS. 4-11 show an example sequence of eight captured gray-code-encoded striped calibration images with the stripes oriented vertically.
Figure 5:
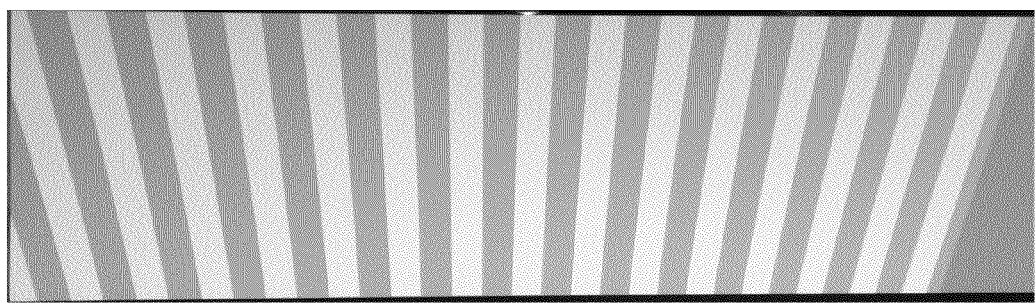
Figure 6:
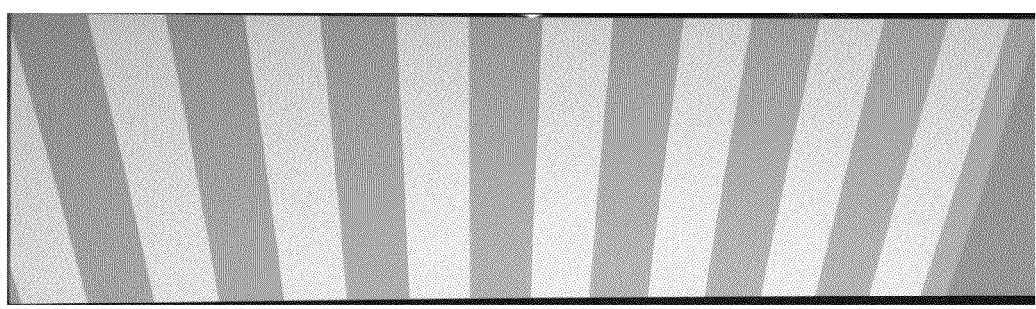
Figure 7:
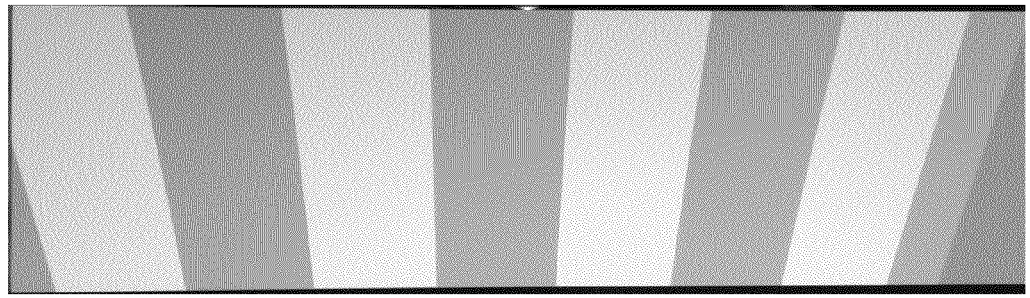
Figure 8:
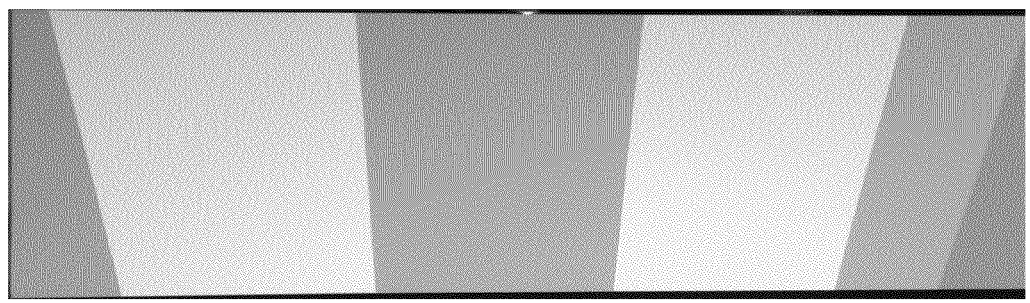
Figure 9:
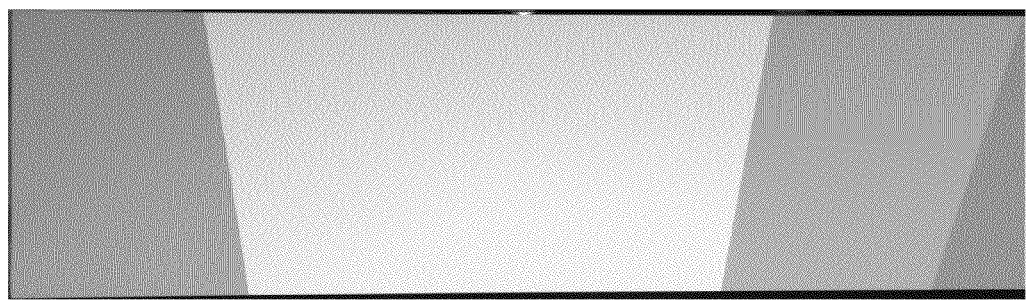
Figure 10:
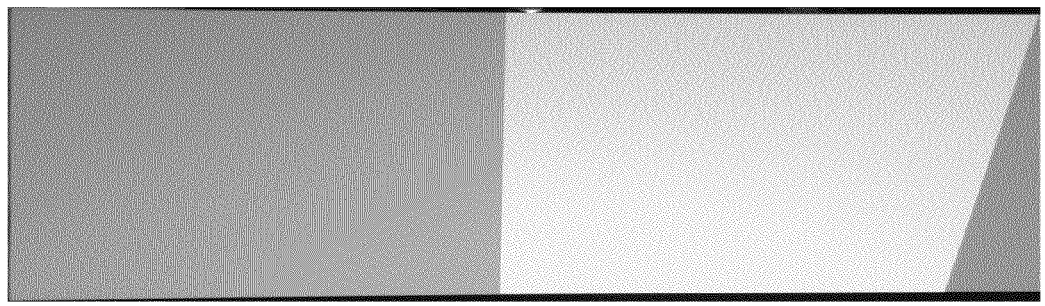
Figure 11:
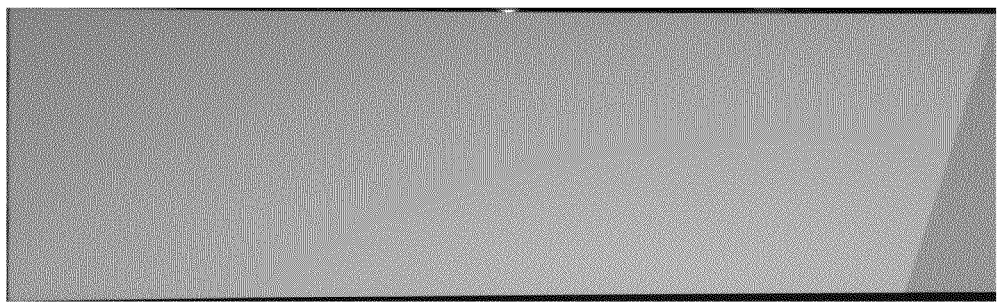

FIGS. 3A-3B show a process 300 for projector platform 106 of FIG. 2 for registering a projector 102 using striped calibration images according to some embodiments. Although in the described embodiments, the elements of the processes disclosed herein are presented in one arrangement, other embodiments may feature other arrangements, as will be apparent to one skilled in the relevant arts based on the disclosure and teachings provided herein. For example, in various embodiments, some or all of the steps of the disclosed processes can be executed in a different order, concurrently, and the like. Elements of process 300 can be repeated for each projector 102 in multi-projector system 100.

Referring to FIGS. 3A-3B, process 300 begins with generating one or more striped calibration images (step 302), each including a plurality of substantially parallel stripes. In some embodiments, the striped calibration images are generated using Gray code encoding. The striped calibration images can include a sequence of images with the stripes oriented vertically and a sequence of images with the stripes oriented horizontally. Then camera 114 captures an image of ambient light falling on display surface 104 (step 304). During the ambient capture, all light from projector 102 is blocked so only the ambient light falling on surface 104 is captured.

Next one of the striped calibration images is received (step 306). Projector 102 projects the image upon display surface 104 (step 308). Projector 102 is described by a projector space comprising a plurality of pixel locations. For clarity, the pixel locations in the projector space are referred to herein as "projector pixel locations" or "projector pixels."

Camera 114 captures the projected striped calibration image (step 310). According to the improved embodiments, the striped calibration images are captured by camera 114 in RGB format. However, while embodiments are described in terms of RGB format, other formats can be used instead, as will be apparent after reading this disclosure.

Steps 306-310 repeat until all of the projected striped calibration images have been captured (step 312). FIGS. 4-11 show an example sequence of eight captured gray-code-encoded striped calibration images with the stripes oriented vertically. The captured striped calibration images 204 are stored with file names that allow images 204 to be identified for retrieval.

Next projector platform 106 processes striped captured calibration images 204. Input module 202 receives one of striped captured calibration images 204 (step 314). Each captured calibration image 204 conforms to a virtual display space that includes a plurality of pixel locations. In some embodiments, the virtual display space is defined by the frame of camera 114. That is, virtual display space has the same resolution and dimensions as the frame of camera 114. Therefore, for clarity, the pixel locations in the virtual display space are referred to herein as "camera pixel locations" or "camera pixels." In other embodiments, other virtual display spaces can be used.

Figure 12:
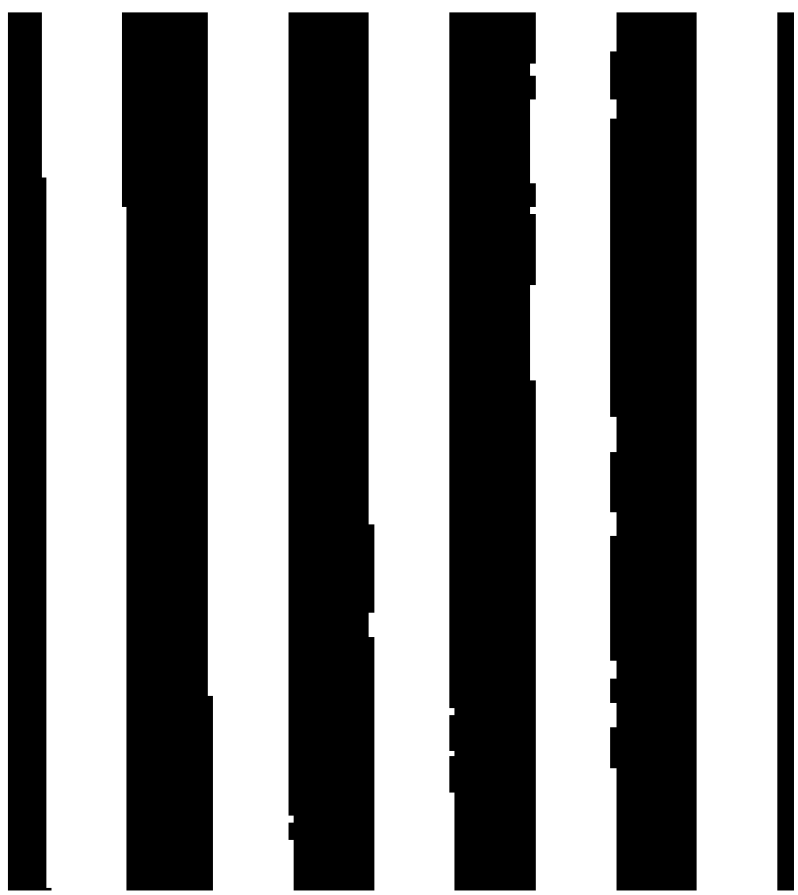
FIGS. 12 and 13 show difference images for striped calibration images.

In some embodiments, the Gray code images are processed by decomposing the image into blue and green color channels. The blue channel is then subtracted from the green channel, creating a gray scale image with white representing the green regions and black representing the blue regions, as shown in FIG. 12. One problem with this approach is that the green and blue channels as captured by camera 114 are not pure, so that the separation between the color channels leaves artifacts when the images are subtracted. These artifacts have a negative impact on registration accuracy, especially near the green/blue edges as can be seen in FIG. 12. To address this problem, improved embodiments were developed, as described below.

Figure 13:
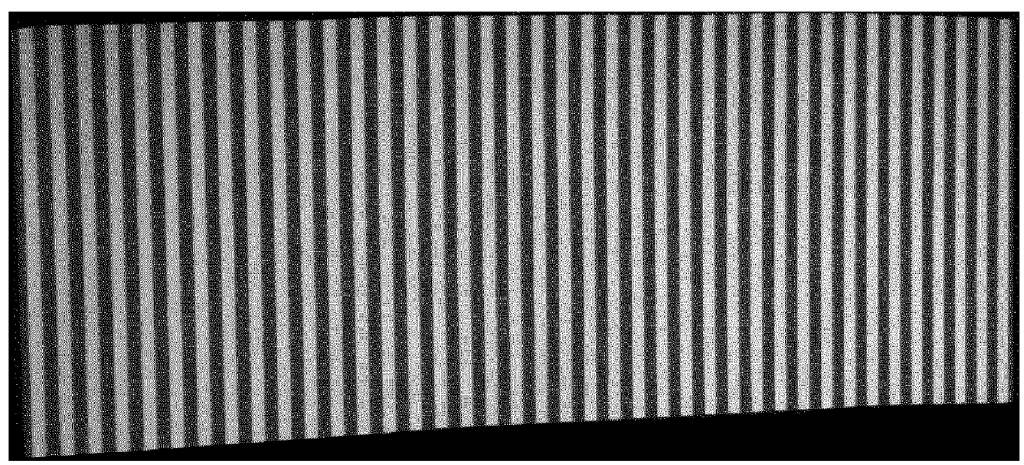

Experience has shown that the red channel of the RGB format is the most noisy, followed by the blue channel, then the green channel. Therefore processing of each captured striped calibration image 204 begins with the green channel. Of course, other color channels can be used instead. Grayscale module 216 selects the green channel from captured striped calibration image 204, thereby creating a "green" grayscale image (step 316). Grayscale module 216 also selects the green channel from the captured image of ambient light, thereby creating an "ambient" grayscale image (step 318). Difference module 218 then subtracts the ambient grayscale image from the green grayscale image, thereby creating a difference image (step 320). A light thresholding is applied to the difference image to remove any pixels with a value<5. An example of the resulting difference image is shown in FIG. 13.

Based on the file naming scheme, image processing module 210 can determine the orientation of the stripes in the difference image. The processing of a difference image having vertical stripes will be described. Difference images having horizontal stripes are processed in a similar manner.

Figure 14:
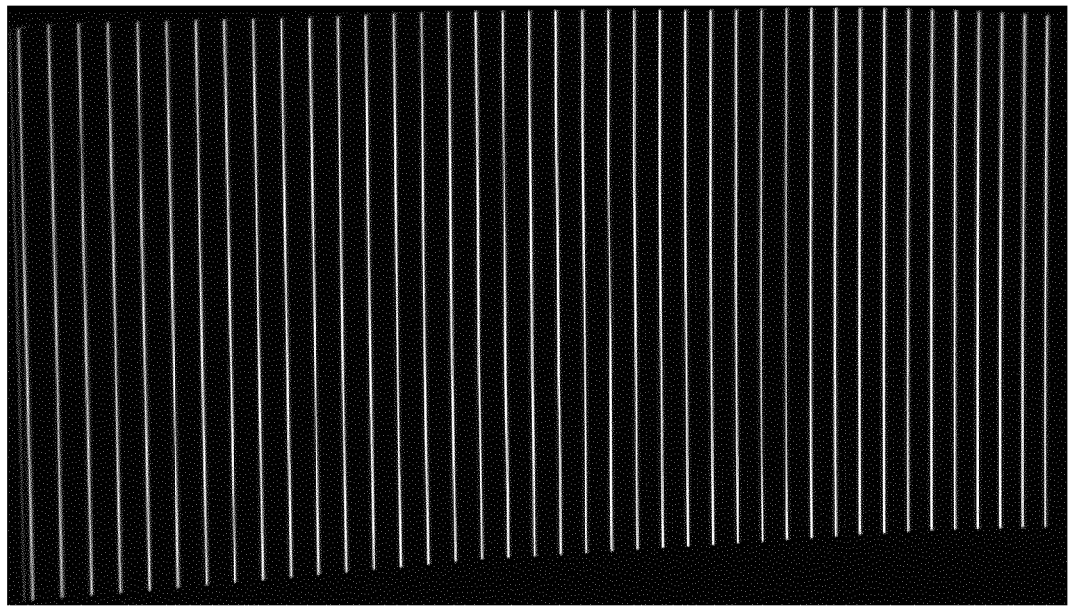
FIG. 14 shows an image containing lines representing the left edges of the stripes in the difference image of FIG. 13.
Figure 15:
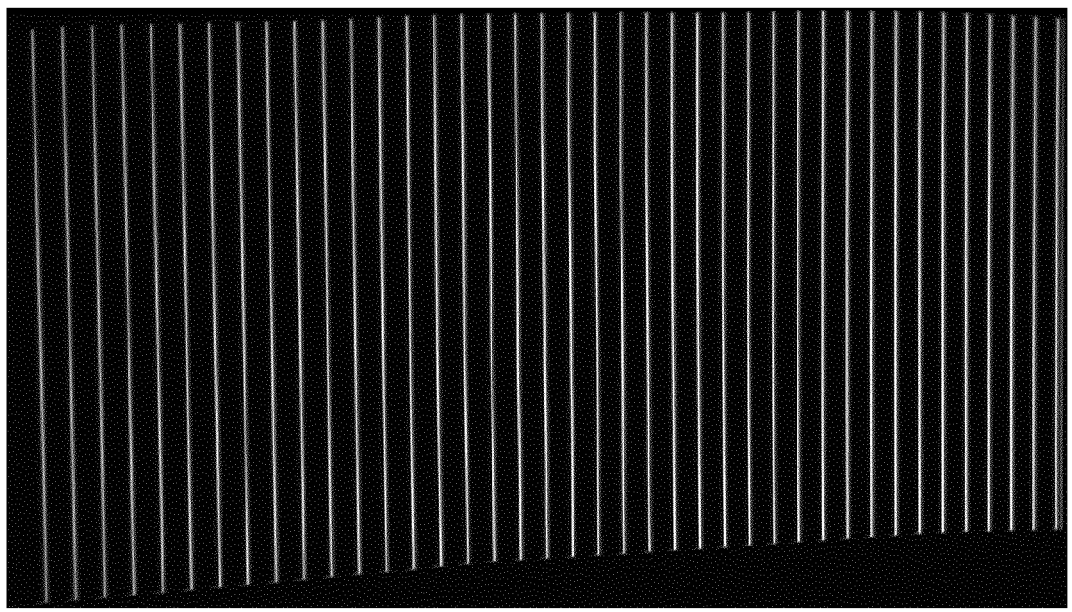
FIG. 15 shows an image containing lines representing the left edges of the stripes in the difference image of FIG. 13.

Edge detection module 212 of projector platform 106 detects edges of the stripes in the difference image (step 322). In processing vertical stripes, edge detection module 212 applies an edge detect filter to select the left edges of the stripes using the gradient moving from dark to light when moving from left to right across the difference image. The resulting image contains lines representing the left edges of the stripes in the difference image of FIG. 13, as shown in FIG. 14. Similar processing is applied to detect the right edges of the stripes in the difference image of FIG. 13, as shown in FIG. 15.

Figure 16:
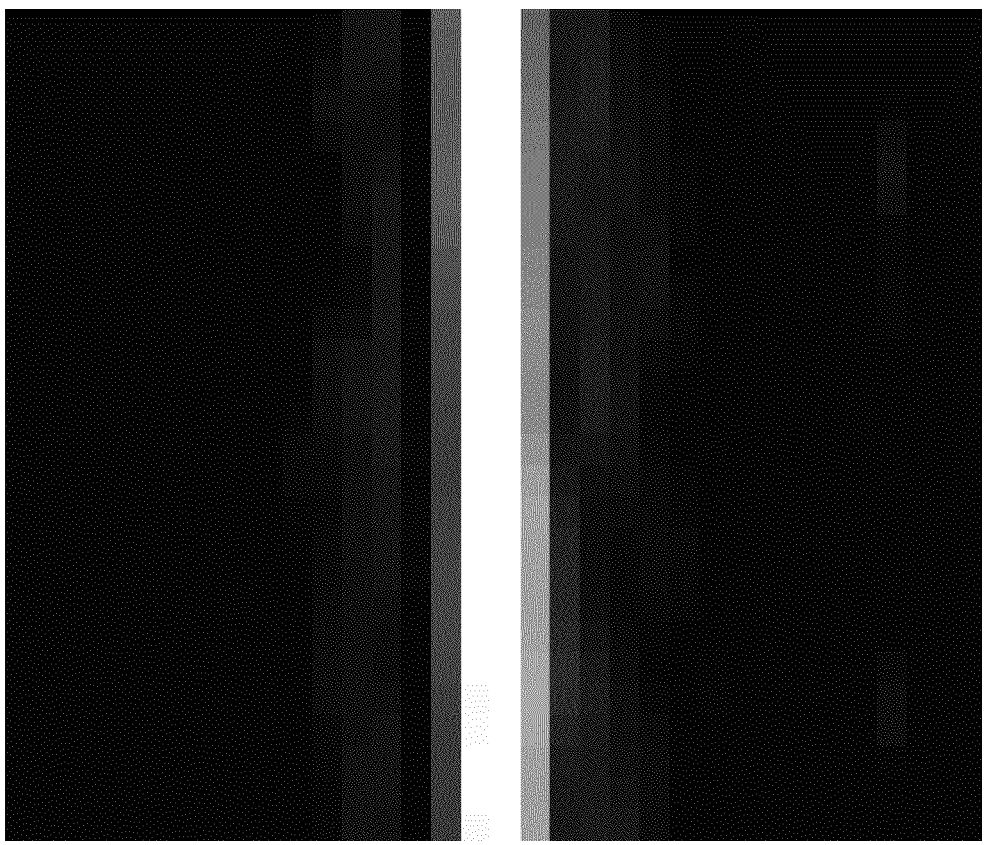
FIG. 16 shows a line representing an edge before line enhancement.
Figure 17:
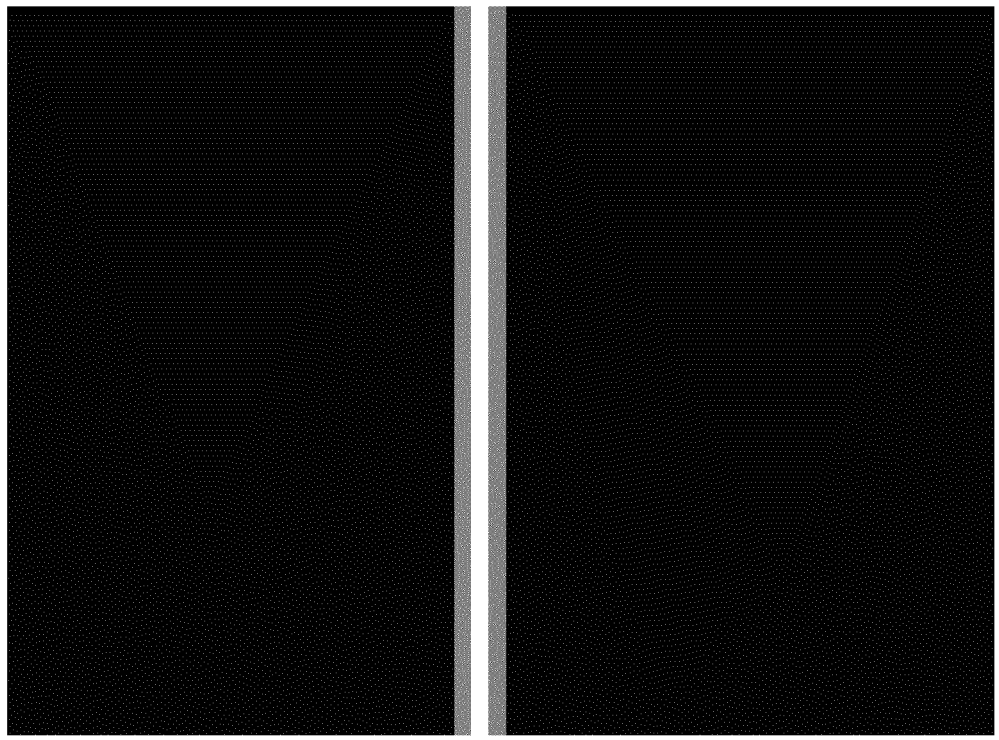
FIG. 17 shows the result of line enhancement for the line of FIG. 16.

The lines created during the edge detection span multiple pixels and include noise, as shown in FIG. 16. Therefore, enhancement module 220 enhances the lines (step 324). In particular, enhancement module 220 processes the images containing the left and right edges to obtain lines that are only a single pixel wide. FIG. 17 shows the result of line enhancement for the line of FIG. 16. The gray bands on each side of the line in FIG. 17 can be added by enhancement module 220, but are not needed.

Figure 19:
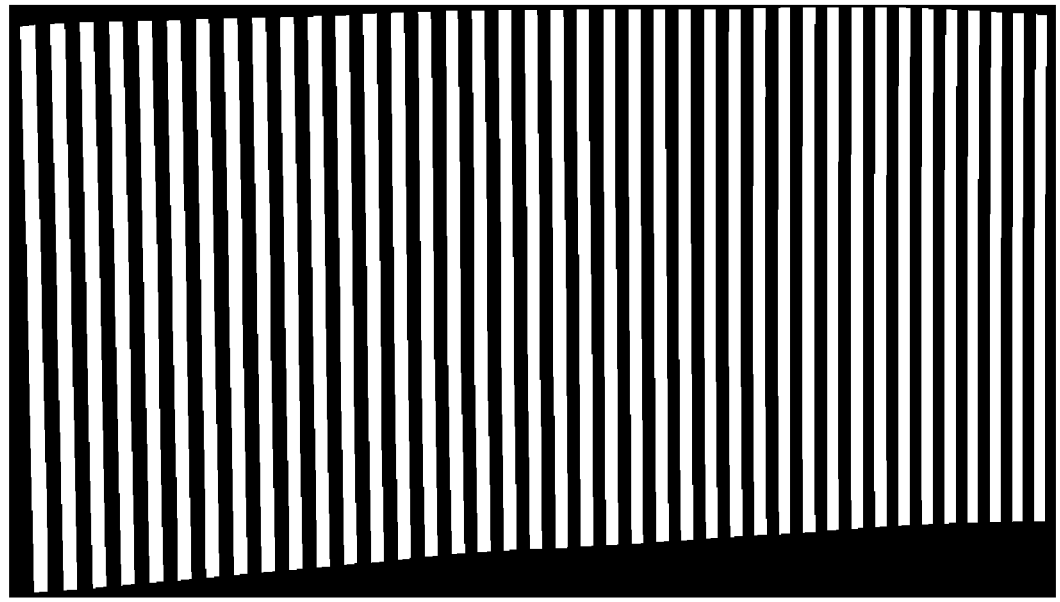
FIG. 19 shows an example enhanced captured calibration image, masked with a projector region mask.
Figure 20:
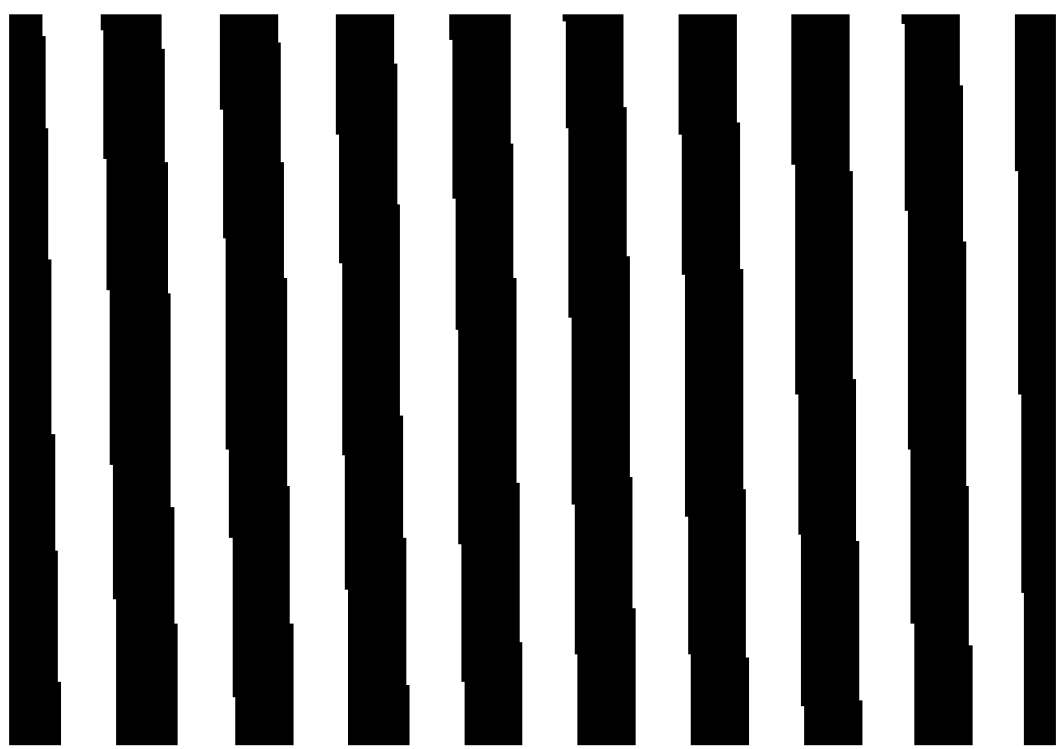
FIG. 20 is a close-up view of FIG. 19.

After line enhancement, stripe module 214 reproduces the stripes based on the enhanced lines (step 326). That is, stripe module 214 reproduces each stripe based on the enhanced lines representing the left and right edges of the stripe. This reproduction is accomplished in two passes, working with the two line-enhanced images representing the left and right stripe edges, and producing one enhanced captured calibration image. Example code for implementing the reproduction is shown in FIGS. 18A-B. FIG. 19 shows an example enhanced captured calibration image, masked with a projector region mask that defines the region in the virtual display space occupied by the projection on display surface 104 of projector 102. FIG. 20 is a close-up view of FIG. 19, and can be compared to FIG. 12 to illustrate the removal of undesirable artifacts by the processing described above.

In some of the captured striped calibration images, the green regions are flush with the left or right edges of the projector region mask. Because of noise and slight variations in light patterns, the edge detection for these images may not precisely follow the edge of the projector region mask. If there are any gaps between the edge of the green region and the mask, pixels in the gaps will have invalid mapping coordinates, causing stray pixels to appear in the body of the projector image. An edge filling process can be used to address this case. An example edge filling process is now described for edge filling module 222 of projector platform 106.

First the distance between the edge of the enhanced captured calibration image and the edge of the projector region mask is measured. Next the distance from the edge of the image to the edge of the first filled stripe in the enhanced captured calibration image is measured. Next the difference in the distances is calculated, taking into account any pixels that may wrap around the corners creating large distances. Next the average distance is calculated. For example, the average distance can be calculated as the sum of the differences divided by the count of lines with a difference greater than zero. If this average distance is less than 3.0, the edge is flush and should be filled. The filling step fills white pixels between the edge of the stripe to the edge of projector region mask. After edge filling is completed, the image is saved to be used for creating the camera to projector coordinate mapping 208.

When all of the captured striped calibration images have been processed (step 328), a coordinate mapping 208 can be generated. Correspondence module 206 generates the coordinate mapping 208 by determining the correspondence between each projector pixel and one or more camera pixels based upon the stripes in the enhanced captured striped calibration images (step 330). Mapping 208 can be generated according to conventional techniques. Mapping 208 can be stored in two matrices, one for each coordinate axis, that conform to the virtual display space. Mapping 208 is resolved to approximately sixteen pixels.

Once mapping 208 is generated for a projector 102, that mapping 208 and projector 102 can be used to project images such as still images and video frames that conform to the virtual display space. Of course, any image can be used after mapping 208 that image into the virtual display space. Projector 102 projects these images onto surface 104 based on the correspondence (step 332).

Now a process for registering a projector 102 using raster calibration images is described. This process can be used independently or in conjunction with process 300 for registering a projector 102 using striped calibration images. When used in conjunction with process 300, the raster image calibration process can move the projector to camera mapping 208 resolution from sixteen pixels to a single pixel.

Figure 21A:
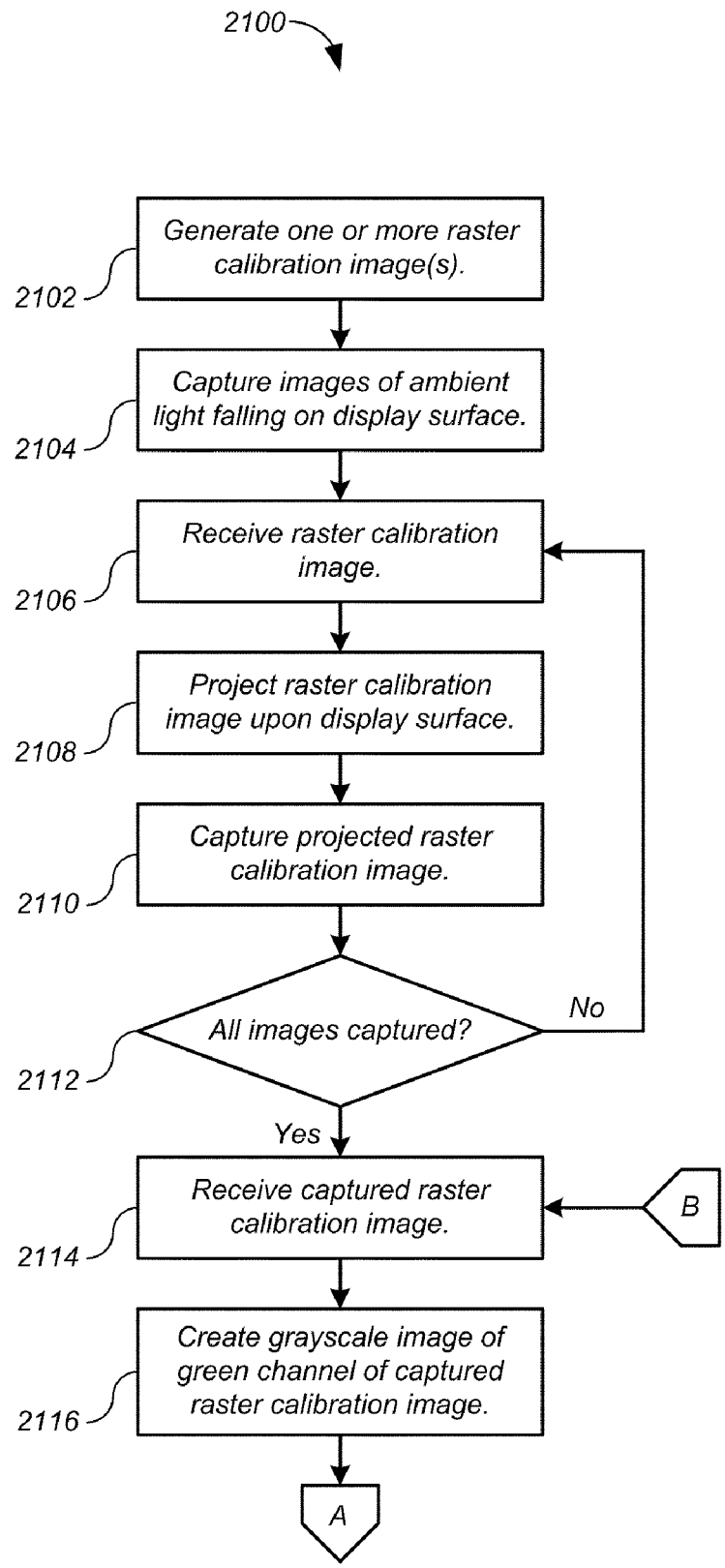
FIGS. 21A-21B show a process for the projector platform of FIG. 2 for registering a projector using raster calibration images according to some embodiments.
Figure 21B:
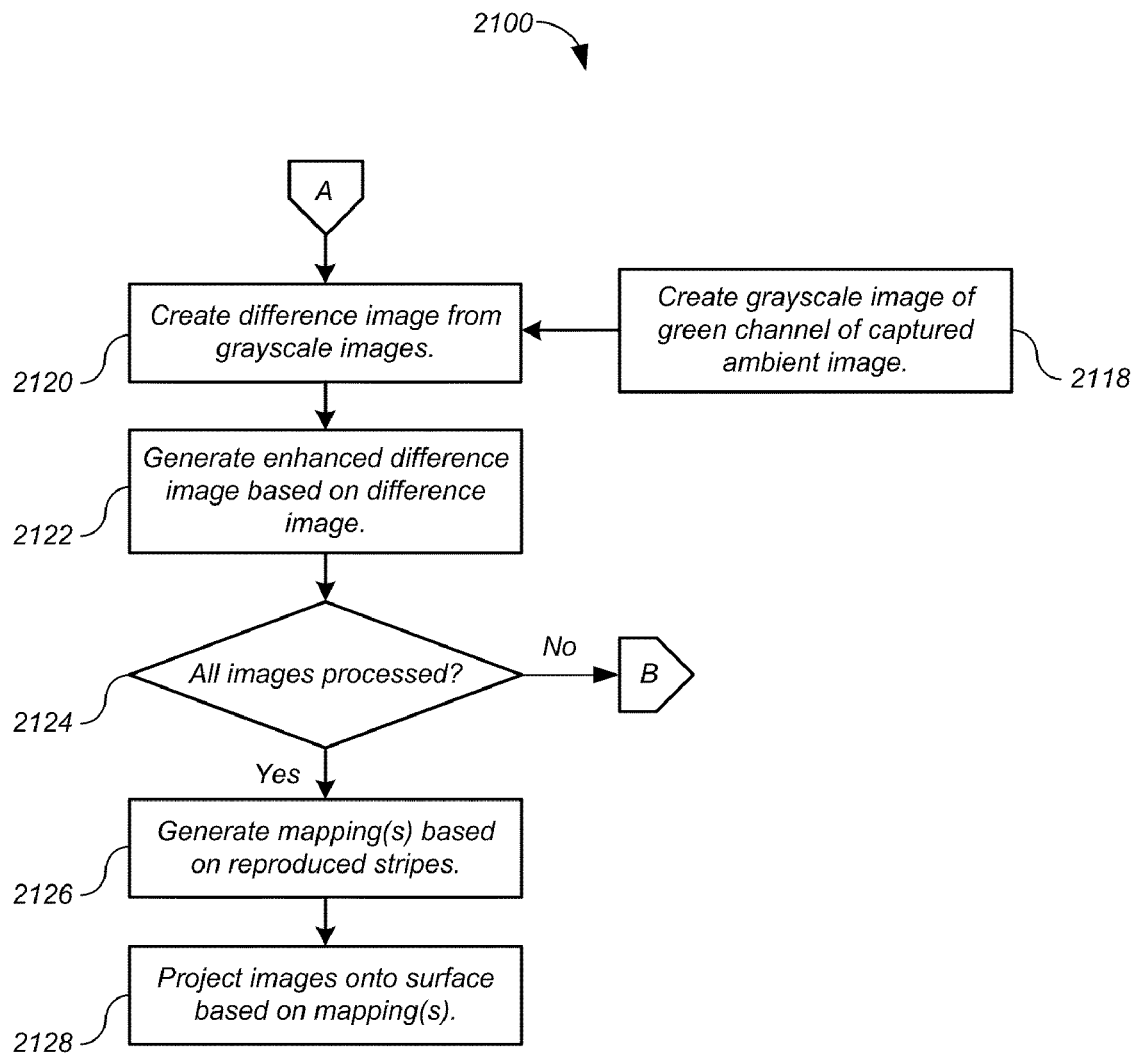

FIGS. 21A-21B show a process 2100 for projector platform 106 of FIG. 2 for registering a projector 102 using raster calibration images according to some embodiments. Although in the described embodiments, the elements of the processes disclosed herein are presented in one arrangement, other embodiments may feature other arrangements, as will be apparent to one skilled in the relevant arts based on the disclosure and teachings provided herein. For example, in various embodiments, some or all of the steps of the disclosed processes can be executed in a different order, concurrently, and the like. Elements of process 2100 can be repeated for each projector 102 in multi-projector system 100 of FIG. 1.

Referring to FIGS. 21A-21B, process 2100 begins with generating one or more raster calibration images (step 2102), each including a plurality of substantially parallel lines. The raster calibration images can include a sequence of images with the lines oriented vertically and a sequence of images with the lines oriented vertically.

Then camera 114 captures two images of ambient light falling on display surface 104 (step 2104). In some cases, the intensity of a single pixel-white line can vary depending on the line's orientation: vertical versus horizontal. As part of the calibration process the correct camera exposures are determined for both vertical and horizontal raster images. Using these two camera exposure settings, two ambient images are captured. During the ambient capture, all light from projector 102 is blocked so only the ambient light falling on surface 104 is captured.

Input module 202 receives one of the raster calibration images (step 2106). Projector 102 projects the image upon display surface 104 (step 2108). Camera 114 captures the projected raster calibration image (step 2110). According to the improved embodiments, the raster calibration images are captured by camera 114 in RGB format. However, while embodiments are described in terms of RGB format, other formats can be used instead, as will be apparent after reading this disclosure.

Figure 22:
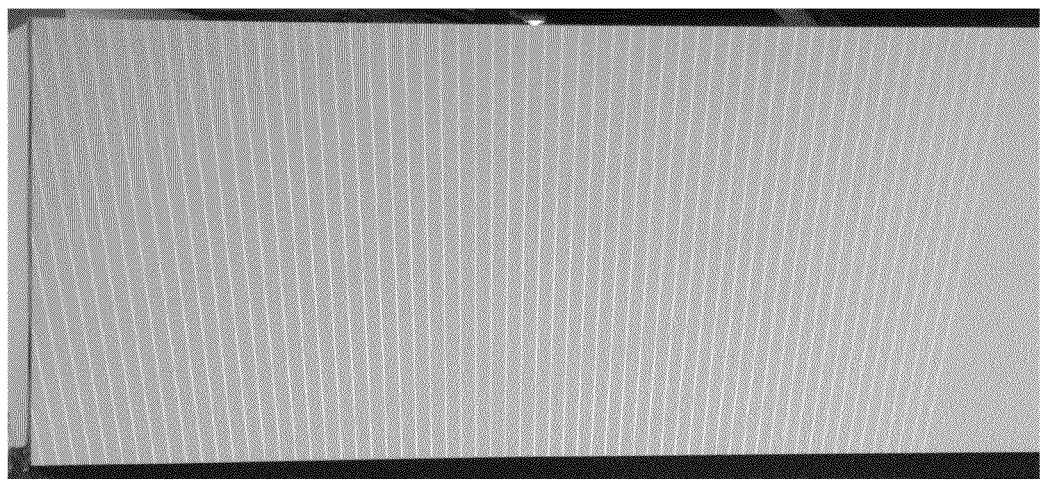
FIG. 22 shows an example captured raster calibration image in a sequence of sixteen, with the lines oriented vertically.

Steps 2106-2110 repeat until all of the projected raster calibration images have been captured (step 2112). FIG. 22 shows an example captured raster calibration image in a sequence of sixteen, with the lines oriented vertically. In the example sequence, the lines are 16 projector pixels apart, and in each image in the sequence, the lines are shifted to the right by one projector pixel compared to the previous image in the sequence. The captured raster calibration images 204 are stored with file names that allow images 204 to be identified for retrieval.

Next projector platform 106 processes raster captured calibration images 204. Input module 202 receives one of raster captured calibration images 204 (step 2114). Each captured calibration image 204 conforms to a virtual display space that includes a plurality of pixel locations. In some embodiments, the virtual display space is defined by the frame of camera 114. That is, virtual display space has the same resolution and dimensions as the frame of camera 114. Therefore, for clarity, the pixel locations in the virtual display space are referred to herein as "camera pixel locations" or "camera pixels." In other embodiments, other virtual display spaces can be used.

Figure 23:
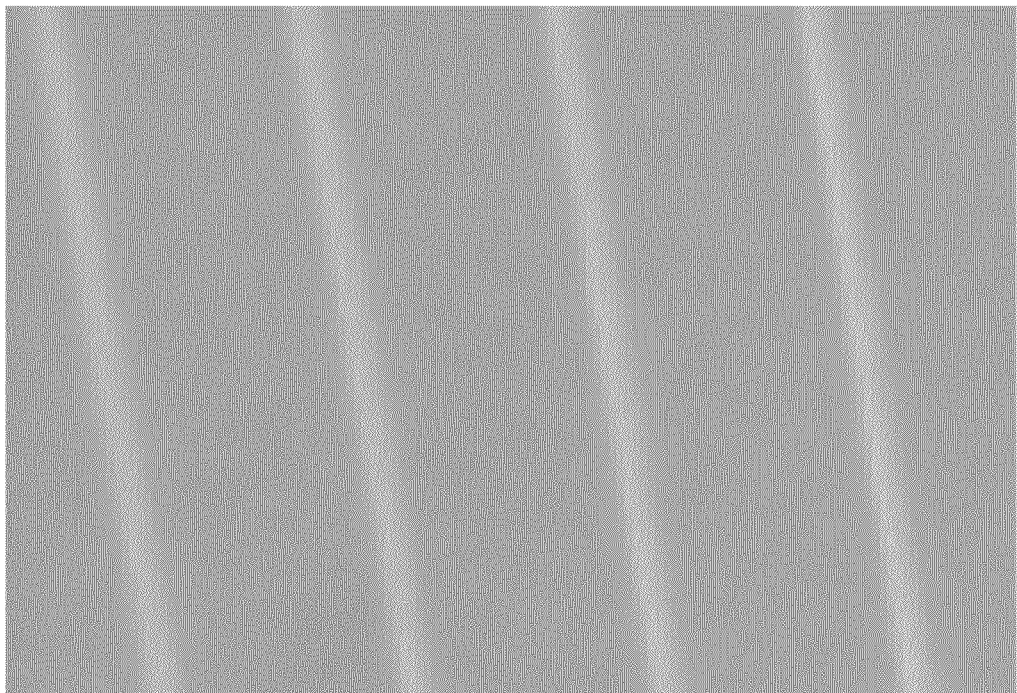
FIG. 23 is close-up of a captured raster calibration image.

In some embodiments, a method of thresholding is used to process the captured raster images. However, the thresholding leaves a number of artifacts and works best in a completely dark room to maximize the distance in values between the lines and the background. In order to refine the projector to camera mapping 208, a binary image is used to accurately place each point. FIG. 23 is close-up of a captured raster calibration image 204. Note that a single pixel line projected by the projector becomes a multi-pixel line when captured. The captured image generally has a higher resolution than the projected image. Thus multiple camera pixels map to a single projector pixel. In other embodiments, the resolution of the projected image can be the same, or greater than, the resolution of the captured image.

Figure 24:
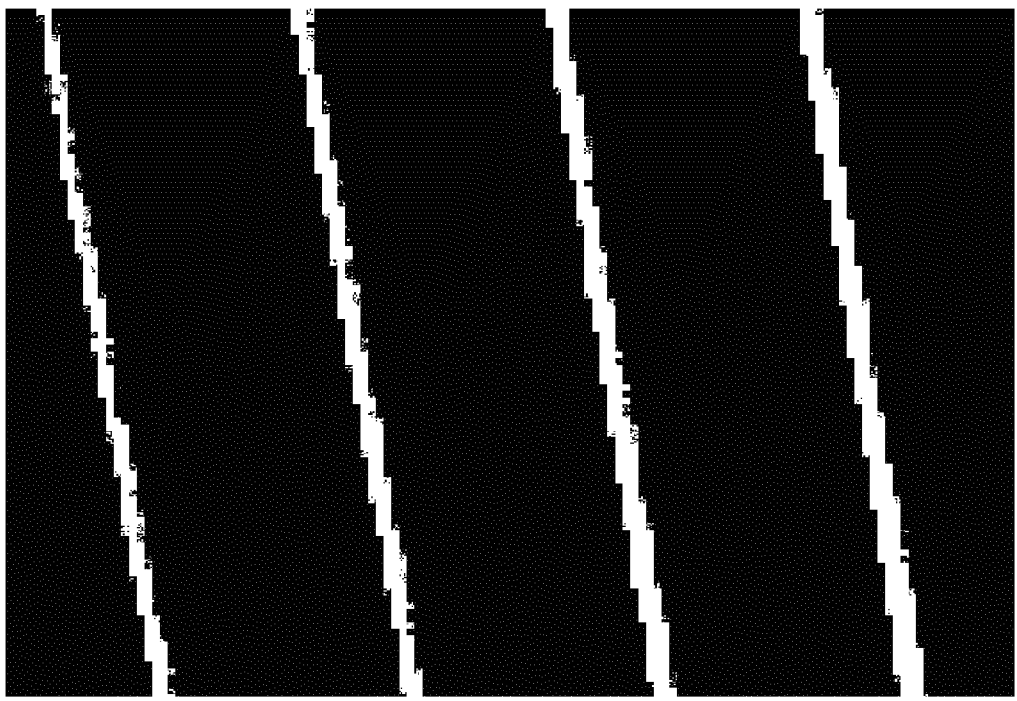
FIG. 24 shows how a single threshold value affects the image of FIG. 23.

It is desirable to minimize the number of camera pixels being mapped. However, uneven light levels from the projector usually produce a brightly lit area in the center of the projection, with the edges growing much darker. This feature prevents a single threshold value from creating an accurate binary representation of the raster image. FIG. 24 shows how a single threshold value affects the image of FIG. 23, with the lines on the left of FIG. 24 being much thinner and noisier than the lines on the right. These artifacts have a negative impact on registration accuracy. To address this problem, improved embodiments were developed, as described below.

Experience has shown that the red channel of the RGB format is the most noisy, followed by the blue channel, then the green channel. Therefore processing of each captured raster calibration image 204 begins with the green channel. Of course, other color channels can be used instead. Grayscale module 216 selects the green channel from captured raster calibration image 204, thereby creating a "green" grayscale image (step 2116). Grayscale module 216 also selects the green channel from the corresponding captured image of ambient light, thereby creating an "ambient" grayscale image (step 2118). Difference module 218 then subtracts the ambient grayscale image from the green grayscale image, thereby creating a difference image (step 2120).

Based on the file naming scheme, image processing module 210 can determine the orientation of the lines in the difference image. The processing of a difference image having vertical lines will be described. Difference images having horizontal lines are processed in a similar manner.

Figure 25:
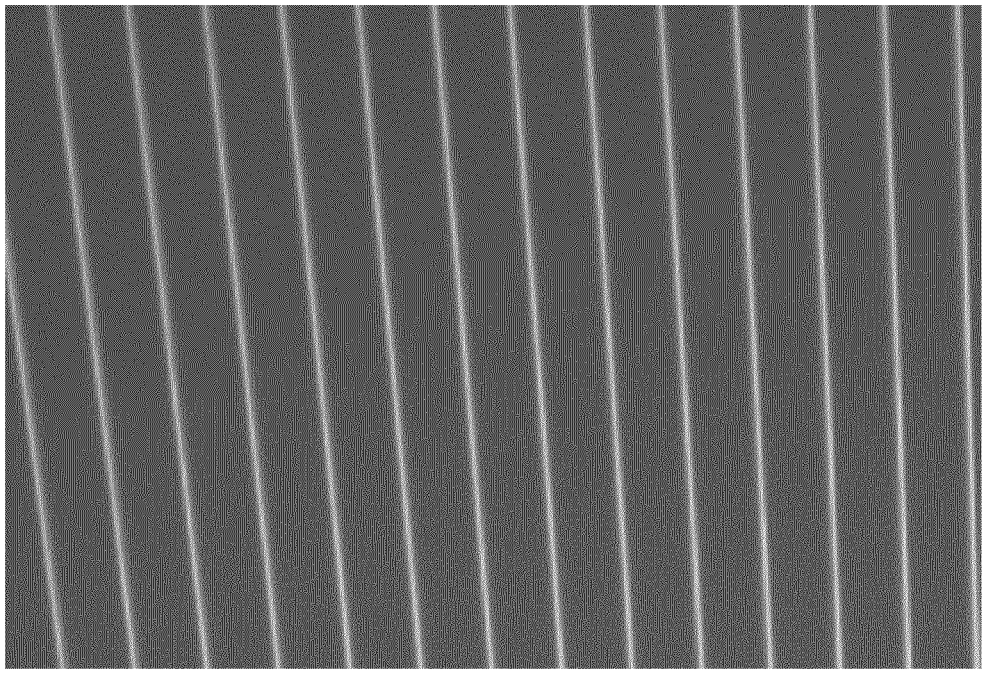
FIGS. 25 and 26 show a difference image before and after initial processing, respectively.
Figure 26:
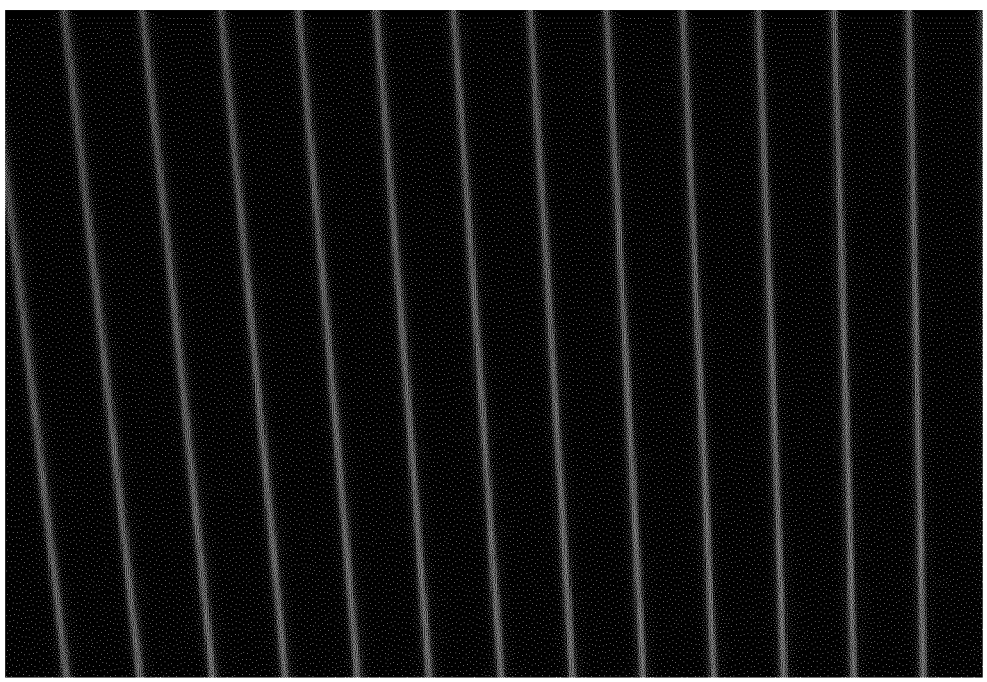

Following the subtraction a light thresholding is applied to remove any pixels with a value<5. This is followed by image smoothing using a 3×3 median filter. Next the image is dilated twice using a 1×3 column structuring unit to strengthen vertical lines, and a 1×3 row structuring unit to strengthen horizontal lines. Finally another light thresholding is applied to remove any remnants from the image processing steps. FIGS. 25 and 26 show the difference image before and after these initial processing steps, respectively.

However, even after initial processing, each line spans many camera pixels in width, as shown in FIG. 27, which is a close-up view of a line in FIG. 26. Line enhancement is applied to create a more accurate representation of the line, as described below.

Enhancement module 220 generates an enhanced difference image based on the difference image (step 2122). That is, enhancement module 220 processes captured raster calibration image 204 to find the most accurate single-pixel representation of the line. Reducing the line width to a single pixel increases the accuracy of the projector to camera mapping 208, and therefore increases the quality of the projections that use those mappings 208. A line enhancement process according to some embodiments is now described.

The line enhancement process first identifies the line columns that cross the midpoint of the image. An average of the middle row, middle row−1 and middle row+1 pixels is taken in case there is a missing pixel in the middle row. This process produces an array of LineOffset objects identifying each line. The data members of the LineOffset object are shown in FIG. 28.

Next the LineOffset objects are used to find the average line spacing and line width to help with the processing and detection of lines that appear only in the corners and do not cross the middle point of the image. With the information stored in the LineOffset object, a LineTrackingData object is created for each line. The LineTrackingData object is used to keep information about the state of the line as each row is processed. The data members of the LineTrackingData object are shown in FIG. 29.

A processing loop is started to process each row starting from the middle row down to the top row (0 offset) in the image. A row of pixels is read from the raster image, and each line in the LineTrackingData array is processed. For each line the offset of the maximum intensity value offset is found within the bounds of the line previously processed. When finding two equal intensity values, the offset that may match an equal offset in the previous row is favored. This helps keep a consistent line without shifting values on every row, which would lead to a jagged line. Also, the maximum value is compared to previous values to make sure the intensity is within a predetermined percentage. This helps the process detect when the line path is fading, for example near the edges of the image.

Once the maximum intensity pixel is found for the line bounds, the average intensity value is calculated for the previous N samples. Again, a number of checks are made to see if the maximum intensity pixel is within a certain percentage of the average, and whether the offset is within the bounds of the LINE_STRAY constant to avoid any large leaps due to noise or distortion. If the maximum intensity pixel is valid, the LineTrackingData object is updated with the current offset, which equals the maximum intensity value offset minus the average line width. This is the offset used to start the search for the maximum intensity pixel in the next row processed. The output image is written with a single pixel of 255 at the location calculated for the maximum intensity pixel. In addition a pixel value of 129 is written to the column next to the maximum intensity location and a pixel of value 128 is written to the right column. The additional pixels (129 and 128 values) are used because in subsequent processing there may be slight gaps between the lines. The additional pixels provide mapping 208 information if no other line has a 255 pixel in that location.

If any problems are detected with either the maximum intensity offset or its value, a line tracking failure count is updated. If there are more than three consecutive rows with problems, the LineTrackingData object is marked as no longer tracking. In subsequent rows the line is ignored and no longer tracked.

After all lines have been processed for the image row, a check is made to determine if additional lines have been found that did not cross the middle row of the image. To detect new raster lines appearing at the edges of the image row, the array of LineTrackingData objects is searched to find the minimum and maximum of the current line offsets. The following section describes how a new line is detected at the start of the buffer. Detection at the end of the buffer follows a similar technique.

First a minimum pixel intensity value is calculated. Next the buffer is traversed towards the head to move past the current line. Next the buffer offset pointer is moved towards the head of the buffer by the minimum column spacing previously calculated. The buffer is then searched toward its head looking for one or more consecutive pixels greater than the calculated minimum intensity value. If one or more such pixels are found a new LineTrackingData object is created with the object marked as a line not found during the initial line detection. This object is also added to the array holding the other LineTrackingData objects and is processed as with other lines in the line processing loops. The buffer offset pointer is then advanced by the minimum column spacing to avoid any spurious pixels.

When all lines from the middle to the top of the image have been processed, the LineTrackingData object is reset with the original line LineOffset data. Next a processing loop is started to process lines from the middle of the image up to the bottom of the image. Example code for implementing the processing loop is shown in FIG. 30.

Figure 31:
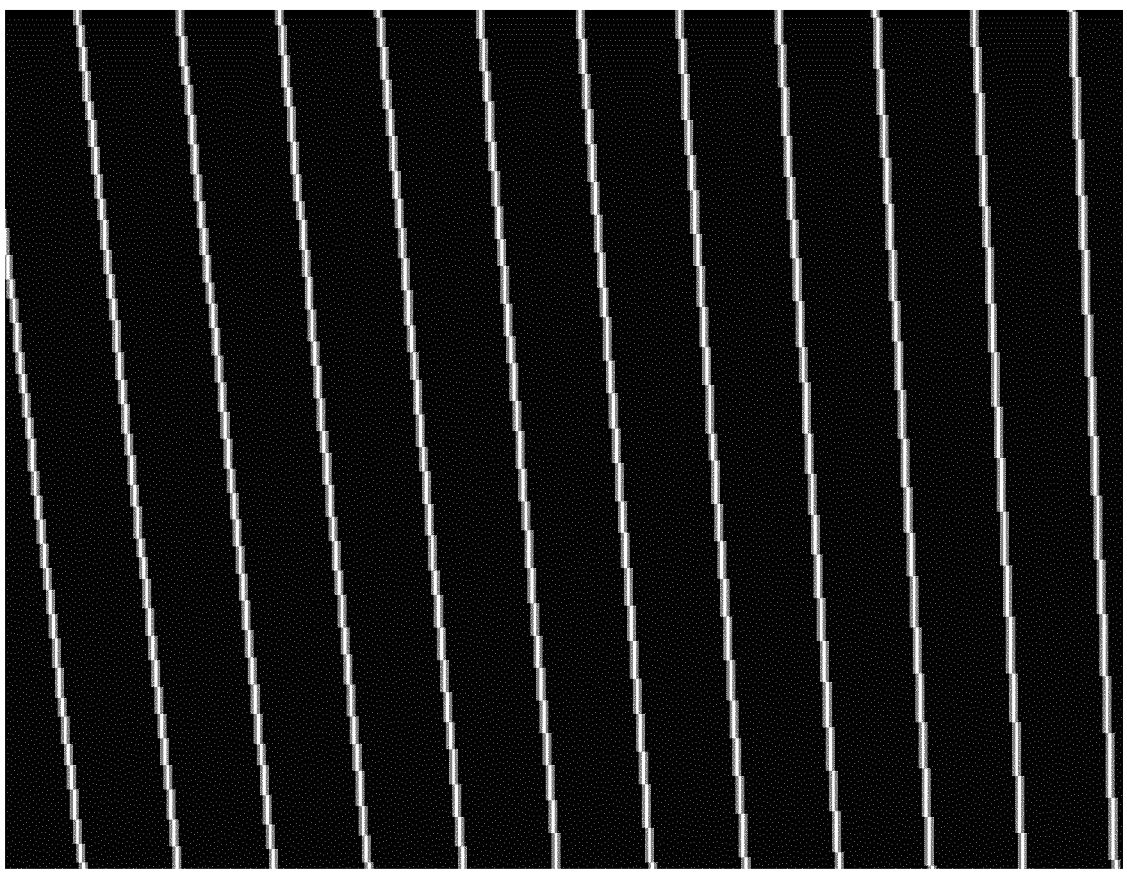
FIG. 31 shows an example image resulting from the raster image processing.
Figure 32:
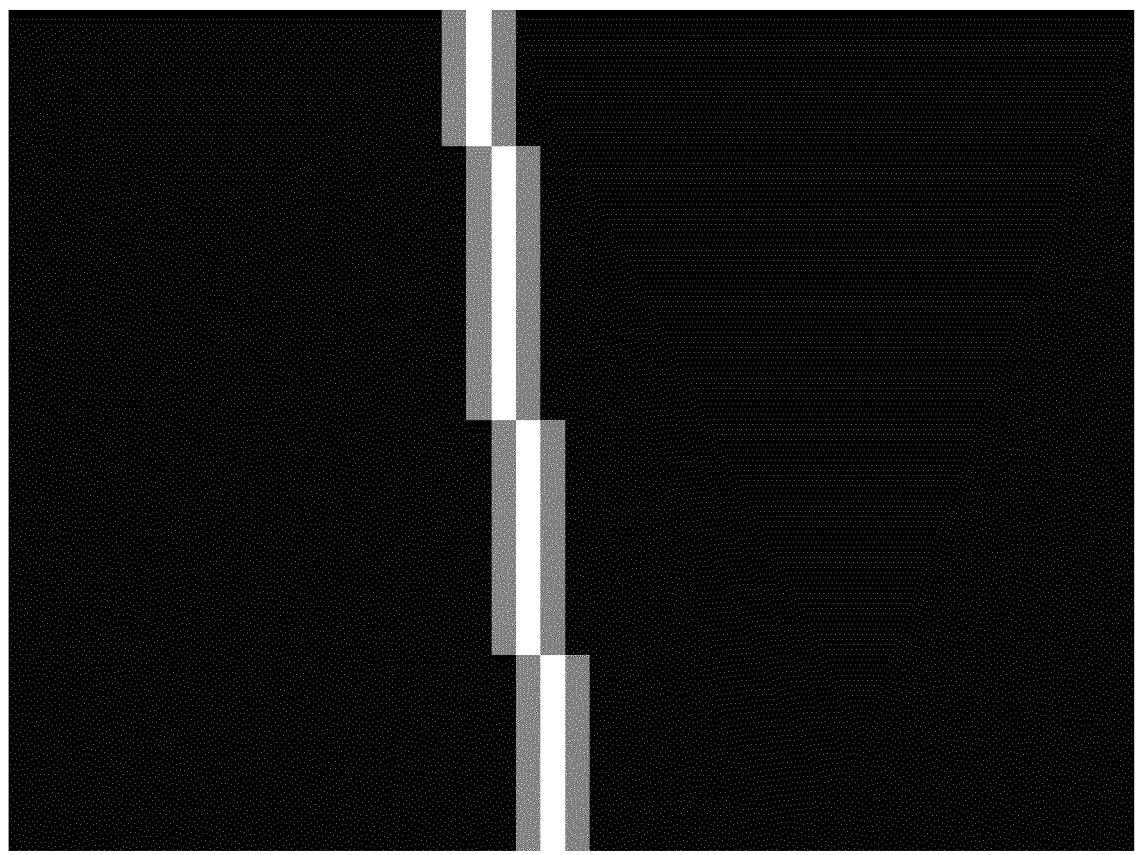
FIG. 32 is a close-up view of the image of FIG. 30.

Once all the lines in the image have been processed, the image is saved. FIG. 31 shows an example image resulting from the raster image processing. FIG. 32 is a close-up view of the image of FIG. 31. Each line in the image is represented by a single pixel of 255 value surrounded by pixels with values of 129 and 128.

When all of the captured raster calibration images have been processed (step 2124), a coordinate mapping 208 can be generated. Correspondence module 206 generates the coordinate mapping 208 by determining the correspondence between each projector pixel and one or more camera pixels based upon the lines in the enhanced captured raster calibration images (step 2126). The processing described above allows Mapping 208 to be generated according to conventional techniques. The processing described above allows mapping 208 to be resolved to a single pixel.

Once mapping 208 is generated for a projector 102, that mapping 208 and projector 102 can be used to project images such as still images and video frames that conform to the virtual display space. Of course, any image can be used after mapping that image into the virtual display space. Projector 102 projects these images onto surface 104 based on the correspondence (step 2128).

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the spirit and scope of this disclosure. Accordingly, other implementations are within the scope of the following claims.

What is claimed is:

1. A method comprising:
    receiving a first image, wherein the first image includes a plurality of substantially parallel first stripes, wherein the first image conforms to a virtual display space, wherein the virtual display space comprises a first plurality of first pixel locations;
    projecting the first image from a projector onto a surface, wherein the projector is described by a projector space comprising a second plurality of second pixel locations;
    capturing a second image of the first image projected onto the surface, wherein the second image conforms to the virtual display space;
    detecting edges of the first stripes based on the second image;
    generating second stripes based upon the edges of the first stripes;
    determining a correspondence between each second pixel location and one or more of the first pixel locations based upon the second stripes;
    capturing a fourth image of ambient light falling upon the surface, wherein the fourth image conforms to the virtual display space;
    receiving a raster image, wherein the raster image includes a plurality of substantially parallel lines, and wherein the raster image conforms to the virtual display space;
    projecting the raster image from the projector onto the surface;
    capturing a fifth image of the raster image projected onto the surface, wherein the fifth image conforms to the virtual display space; and
    determining the correspondence based upon the second stripes, the fourth image, and the fifth image.

2. The method of claim 1, further comprising:
    projecting a third image from the projector onto the surface based on the correspondence, wherein the third image conforms to the virtual display space.

3. The method of claim 1, further comprising:
    generating the second stripes based upon one or more Gray codes.

4. The method of claim 1, further comprising:
    generating a first grayscale image based on a color channel of the fourth image;
    generating a second grayscale image based on a color channel of the fifth image;
    generating a difference image, comprising subtracting the first grayscale image from the second grayscale image; and
    determining the correspondence based upon the second stripes and the difference image.

5. The method of claim 4, further comprising:
    generating an enhanced difference image, comprising enhancing the lines in the difference image; and
    determining the correspondence based upon the second stripes and the enhanced difference image.

6. The method of claim 4:
    wherein the fourth and fifth images are RGB images; and
    wherein the color channel of the fourth and fifth images is green.

7. An apparatus comprising:
    an input module to receive a first image, wherein the first image includes a plurality of substantially parallel first stripes, wherein the first image conforms to a virtual display space, wherein the virtual display space comprises a first plurality of first pixel locations;
    a projector to project the first image onto a surface, wherein the projector is described by a projector space comprising a second plurality of second pixel locations;
    a camera to capture a second image of the first image projected onto the surface, wherein the second image conforms to the virtual display space;
    an edge module to detect edges of the first stripes based on the second
    a stripe module to generate second stripes based upon the edges of the first stripes; and
    a correspondence module to determine a correspondence between each second pixel location and one or more of the first pixel locations based upon the second stripes.

8. The apparatus of claim 7:
    wherein the projector projects a third image from the projector onto the surface based on the correspondence, wherein the third image conforms to the virtual display space.

9. The apparatus of claim 7:
    wherein the stripe module generates the second stripes based upon one or more Gray codes.

10. The apparatus of claim 7:
    wherein the camera captures a fourth image of ambient light falling upon the surface, wherein the fourth image conforms to the virtual display space;
    wherein the input module receives a raster image, wherein the raster image includes a plurality of substantially parallel lines, and wherein the raster image conforms to the virtual display space;
    wherein the projector projects the raster image from the projector onto the surface;
    wherein the camera captures a fifth image of the raster image projected onto the surface, wherein the fifth image conforms to the virtual display space; and
    wherein the correspondence module determines the correspondence based upon the second stripes, the fourth image, and the fifth image.

11. The apparatus of claim 10:
    wherein the apparatus further comprises
    a grayscale module to generate a first grayscale image based on a color channel of the fourth image, and to generate a second grayscale image based on a color channel of the fifth image, and
    a difference module to generate a difference image, comprising subtracting the first grayscale image from the second grayscale image; and
    wherein the correspondence module determines the correspondence based upon the second stripes and the difference image.

12. The apparatus of claim 11, further comprising:
    an enhancement module to generate an enhanced difference image based on the difference image;
    wherein the correspondence module determines the correspondence based upon the second stripes and the enhanced difference image.

13. The apparatus of claim 1:
    wherein the fourth and fifth images are RGB images; and
    wherein the color channel of the fourth and fifth images is green.

14. Tangible, non-transitory computer-readable media embodying instructions executable by a computer to perform a method comprising:
- receiving a second image captured from a first image projected from a projector onto a surface, wherein the first image includes a plurality of substantially parallel first stripes, wherein the first image conforms to a virtual display space, wherein the virtual display space comprises a first plurality of first pixel locations, wherein the second image conforms to the virtual display space, and wherein the projector is described by a projector space comprising a second plurality of second pixel locations;
- detecting edges of the first stripes based on the second image;
- generating second stripes based upon the edges of the first stripes;
- determining a correspondence between each second pixel location and one or more of the first pixel locations based upon the second stripes;
- receiving a fourth image of ambient light falling upon the surface, wherein the fourth image conforms to the virtual display space;
- receiving a fifth image of a raster image projected from the projector onto the surface, wherein the raster image includes a plurality of substantially parallel lines, wherein the raster image conforms to the virtual display space, and wherein the fifth image conforms to the virtual display space; and
- determining the correspondence based upon the second stripes, the fourth image, and the fifth image.

15. The tangible, non-transitory computer-readable media of claim 14:
- wherein the projector projects a third image onto the surface based on the correspondence, wherein the third image conforms to the virtual display space.

16. The tangible, non-transitory computer-readable media of claim 14, wherein the method further comprises:
- generating the second stripes based upon one or more Gray codes.

17. The tangible, non-transitory computer-readable media of claim 14, wherein the method further comprises:
- generating a first grayscale image based on a color channel of the fourth image;
- generating a second grayscale image based on a color channel of the fifth image;
- generating a difference image, comprising subtracting the first grayscale image from the second grayscale image; and
- determining the correspondence based upon the second stripes and the difference image.

18. The tangible, non-transitory computer-readable media of claim 17, wherein the method further comprises:
- generating an enhanced difference image, comprising enhancing the lines in the difference image; and
- determining the correspondence based upon the second stripes and the enhanced difference image.

19. The tangible, non-transitory computer-readable media of claim 17:
- wherein the fourth and fifth images are RGB images; and
- wherein the color channel of the fourth and fifth images is green.

* * * * *